United States Patent
Cho et al.

(10) Patent No.: US 9,342,166 B2
(45) Date of Patent: May 17, 2016

(54) TOUCH SUBSTRATE AND DISPLAY APPARATUS HAVING THE SAME

(71) Applicant: SAMSUNG DISPLAY CO., LTD., Yongin, Gyeonggi-Do (KR)

(72) Inventors: Young-Joon Cho, Suwon-si (KR); Joon-Chul Goh, Hwaseong-si (KR); Ji-Hong Park, Suwon-si (KR); Cheol-Gon Lee, Seoul (KR); Chong-Chul Chai, Seoul (KR); Jae-Keun Lim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 333 days.

(21) Appl. No.: 13/658,726

(22) Filed: Oct. 23, 2012

(65) Prior Publication Data
US 2013/0113734 A1    May 9, 2013

(30) Foreign Application Priority Data
Nov. 8, 2011   (KR) .......................... 10-2011-0115502

(51) Int. Cl.
G06F 3/041    (2006.01)
G06F 3/044    (2006.01)

(52) U.S. Cl.
CPC ................ *G06F 3/041* (2013.01); *G06F 3/044* (2013.01); *G06F 2203/04103* (2013.01); *G06F 2203/04111* (2013.01)

(58) Field of Classification Search
USPC .............................. 345/173; 178/18.01–18.02
See application file for complete search history.

(56) References Cited

U.S. PATENT DOCUMENTS

| | | | |
|---|---|---|---|
| 2007/0242054 A1* | 10/2007 | Chang et al. | 345/173 |
| 2010/0066702 A1* | 3/2010 | Lee et al. | 345/174 |
| 2010/0136868 A1 | 6/2010 | Chien et al. | |
| 2010/0328248 A1* | 12/2010 | Mozdzyn | G06F 3/044 345/174 |
| 2011/0050625 A1 | 3/2011 | Kim et al. | |
| 2011/0050631 A1 | 3/2011 | Kwon et al. | |
| 2011/0134055 A1* | 6/2011 | Jung et al. | 345/173 |
| 2011/0134103 A1* | 6/2011 | Nam et al. | 345/212 |
| 2011/0242028 A1* | 10/2011 | Lee et al. | 345/173 |
| 2011/0247883 A1* | 10/2011 | Lin et al. | 178/18.03 |
| 2011/0304582 A1* | 12/2011 | Ho et al. | 345/174 |
| 2012/0211772 A1* | 8/2012 | Moh et al. | 257/88 |

FOREIGN PATENT DOCUMENTS

KR    0936009 B1    12/2009

* cited by examiner

*Primary Examiner* — Jason Olson
*Assistant Examiner* — Sosina Abebe
(74) *Attorney, Agent, or Firm* — Innovation Counsel LLP

(57) ABSTRACT

In a touch substrate and a display apparatus, the touch substrate includes a first electrode, a second electrode, a first touch electrode and a blocking layer. The first electrode includes an opaque conductive material and extends along a first direction. The second electrode includes the opaque conductive material, extends along a second direction crossing the first direction, and has a gap through which the first electrode extends. The first touch electrode is formed on the first electrode and is electrically connected to the first electrode. The blocking layer overlaps the first and second electrodes.

27 Claims, 18 Drawing Sheets

FIG. 2
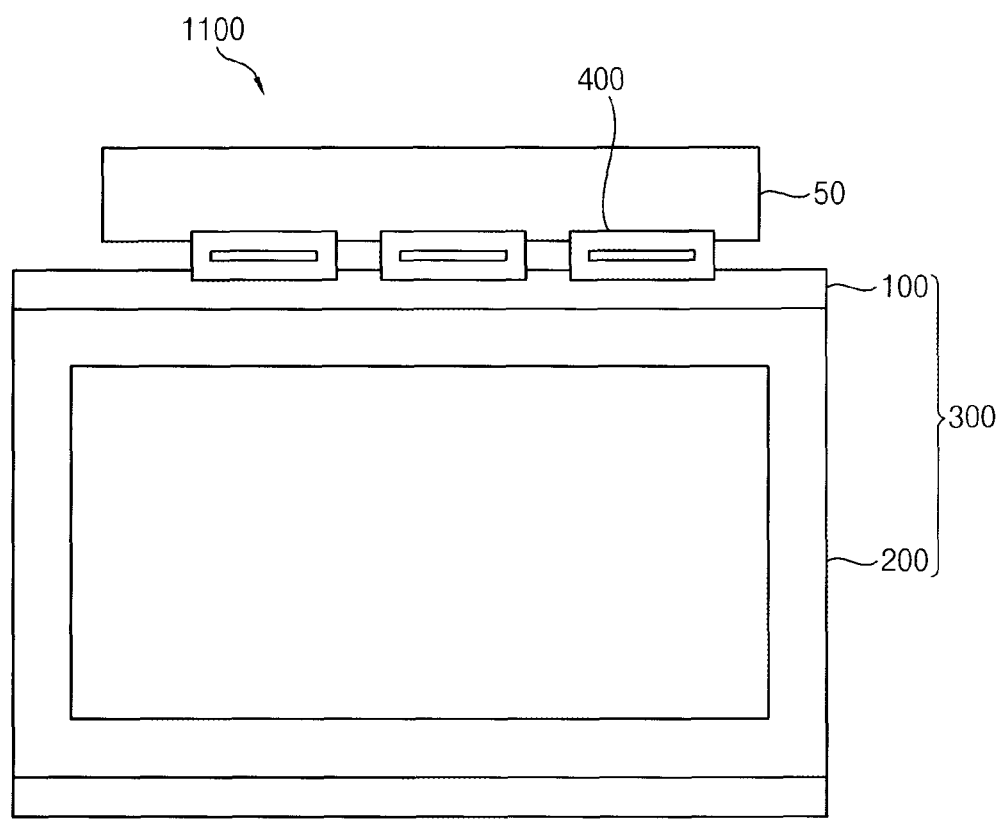
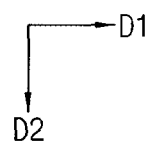

TOUCH SUBSTRATE AND DISPLAY APPARATUS HAVING THE SAME

CROSS-REFERENCE TO RELATED APPLICATION

This application claims priority to Korean Patent Application No. 10-2011-0115502, filed on Nov. 8, 2011, as well as all the benefits accruing therefrom under 35 U.S.C. §119, the content of which is herein incorporated by reference in its entirety.

BACKGROUND OF THE INVENTION

1. Field of the Invention

Example embodiments of the present invention relate generally to touch panels. More particularly, example embodiments of the present invention relate to a touch substrate having enhanced touch sensitivity, and a display apparatus incorporating the touch substrate.

2. Description of the Related Art

Display apparatuses having touch display panels have come into wider use in recent years. In the touch display panel, a signal may be input on a screen using a stylus pen, a finger or the like, without need for an additional remote controller, a keypad or other input device.

Touch display panels are commonly classified into capacitive type, resistive type, and optical type panels, as well as others, according to the touch detecting method employed.

Conventionally, the touch panel is touched using the finger, the stylus pen, etc. as above, and then a touch position is detected from the corresponding change in an amount of electrical charge. This technology allows for a relatively small touch or a relatively smooth touch to be sufficient for detecting the touch position.

However, such panels often employ a dedicated touch line formed using a transparent conductive material having an excessively high resistance.

SUMMARY OF THE INVENTION

Example embodiments of the present invention provide a touch substrate having reduced resistance, enhanced touch sensitivity, and simplified manufacture.

Example embodiments of the present invention provide a display apparatus having the touch substrate.

According to an example embodiment of the present invention, a touch substrate includes a first electrode, a second electrode, a first touch electrode and a blocking layer. The first electrode includes an opaque conductive material and extends along a first direction. The second electrode includes the opaque conductive material, extends along a second direction crossing the first direction, and has a gap through which the first electrode extends. The first touch electrode is formed on the first electrode and is electrically connected to the first electrode. The blocking layer overlaps the first and second electrodes.

In an example embodiment, the first electrode may include a plurality of first main electrodes, a plurality of first connecting electrodes and a plurality of first contact holes. Each of the first connecting electrodes may extend along the first direction, connect adjacent ones of the first main electrodes to each other and have a width narrower than its respective adjacent first main electrodes. The first main electrodes may be exposed through a respective one of the first contact holes.

In an example embodiment, the first touch electrode may overlap with one of the first main electrodes, and the first touch electrode may be electrically connected to one of the first main electrodes through one of the first contact holes.

In an example embodiment, an area of the first touch electrode may be larger than an area of one of the first main electrodes.

In an example embodiment, the second electrode may include a plurality of second main electrodes, a plurality of second connecting electrodes and a plurality of second contact holes. The second connecting electrodes may extend along the second direction, connect adjacent ones of the second main electrodes to each other and may have gaps spanning intervening first main electrodes. The second main electrodes may be exposed through respective ones of the second contact holes.

In an example embodiment, the second electrode may be formed on the touch substrate, and the second electrode may further include a plurality of second touch electrodes each electrically connecting two of the second connecting electrodes that lie on opposite ends of one of the gaps.

In an example embodiment, each second touch electrode may overlap a pair of the second main electrodes corresponding to one of the gaps, and may be electrically connected to the pair of the second main electrodes through the corresponding second contact hole.

In an example embodiment, an area of the second touch electrode may be larger than that of the second main electrode.

In an example embodiment, the second touch electrode may include a transparent conductive material.

In an example embodiment, the second touch electrode may be formed on a first surface of the touch substrate.

In an example embodiment, the first touch electrode may include a transparent conductive material.

In an example embodiment, the blocking layer may be formed between the first electrode and the second touch electrode.

In an example embodiment, the touch substrate may further include a color filter formed on the first and second electrodes, and the first and second electrodes, and the first touch electrode may each be formed on a first surface of the touch substrate.

According to another example embodiment of the present invention, a display apparatus includes a touch substrate, an array substrate and a connecting portion. The touch substrate includes a first electrode, a second electrode, a first touch electrode and a blocking layer. The first electrode extends along a first direction. The second electrode extends along a second direction crossing the first direction and has a gap through which the first electrode extends. The first touch electrode is formed on the first electrode and is electrically connected to the first electrode. The blocking layer overlaps the first and second electrodes. The array substrate includes a touch signal pad for transmitting a touch signal, and also includes a data pad. The connecting portion electrically connects the second electrode and the touch signal pad.

In an example embodiment, the display apparatus may further include a flexible printed circuit board electrically connected to the data pad and the touch signal pad.

In an example embodiment, the first and second electrodes, and the touch signal pad may each include an opaque conductive material.

In an example embodiment, the touch substrate may include a third connecting electrode electrically connected to the second electrode. The array substrate may include a fourth connecting electrode electrically connected to the touch signal pad.

In an example embodiment, each of the third and fourth connecting electrodes may include a transparent conductive material.

In an example embodiment, the connecting portion may be a conductive bump disposed between the third and fourth connecting electrodes and may electrically connect the third connecting electrode to the fourth connecting electrode.

In an example embodiment, the conductive bump may include indium.

In an example embodiment, the touch substrate may further include a spacer maintaining a space between the touch substrate and the array substrate. The third connecting electrode may be electrically connected to the first electrode and covers the spacer.

In an example embodiment, the third connecting electrode may contact the fourth connecting electrode.

In an example embodiment, the first and second electrodes, and the first and second touch electrodes may all be formed on a first surface of the touch substrate. The touch substrate may further include a color filter formed on the first and second electrodes.

According to the above-mentioned example embodiments, resistances of first and second electrodes may be decreased and a transmittance and touch sensitivity may be maintained.

In addition, a touch panel may be formed via patterning a surface of a second base substrate, and thus a turning process for the second base substrate may be omitted. Thus, a manufacturing process for the touch panel may be simplified.

BRIEF DESCRIPTION OF THE DRAWINGS

The above and other features and advantages of the present invention will become more apparent by describing in detailed example embodiments thereof with reference to the accompanying drawings, in which:

FIG. 2 is a plan view illustrating a display apparatus according to another example embodiment of the present invention;

DETAILED DESCRIPTION OF THE INVENTION

Hereinafter, the present invention will be explained in detail with reference to the accompanying drawings.

Figure 1A:
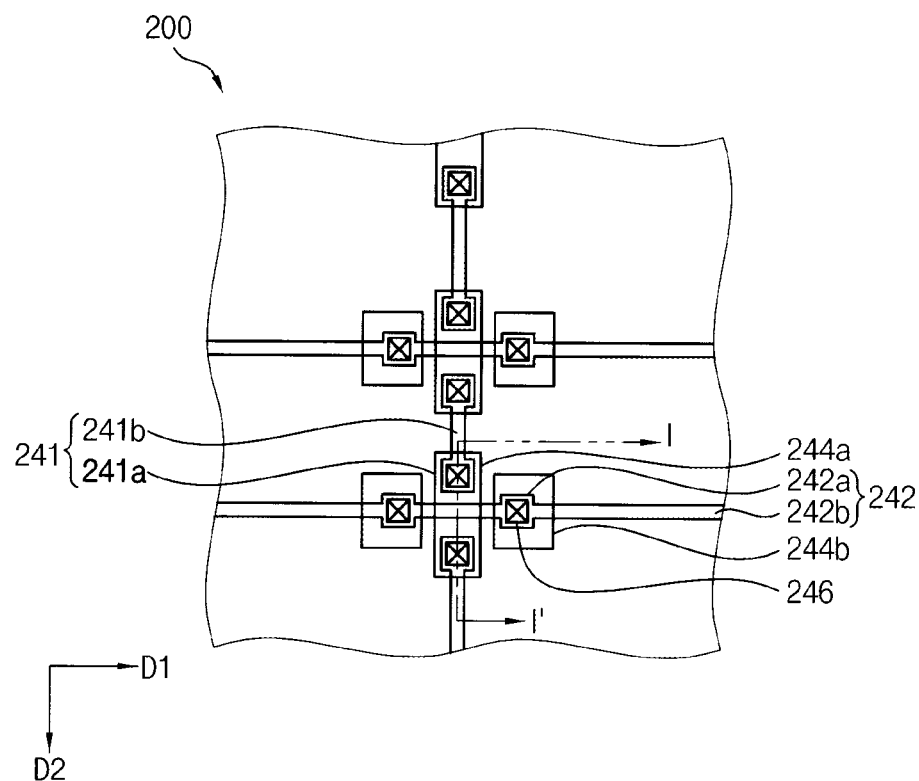
FIG. 1A is a plan view illustrating a touch substrate according to an example embodiment of the present invention.
Figure 1B:
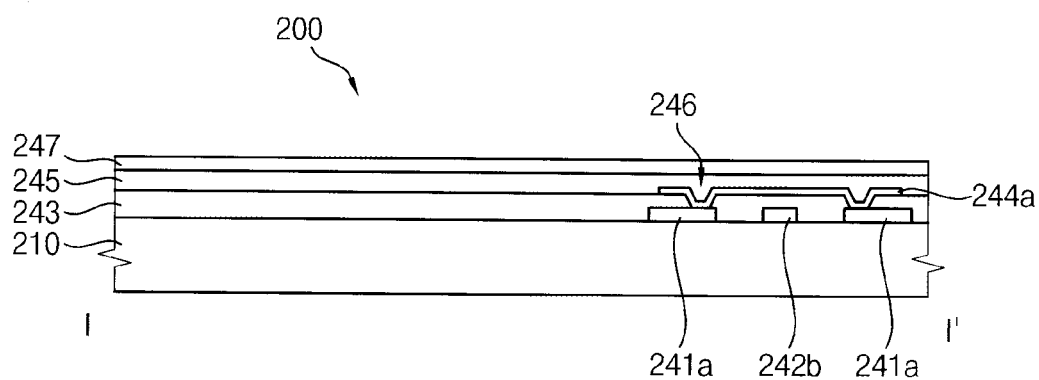
FIG. 1B is a cross-sectional view taken along a line I-I' of FIG. 1A.

FIG. 1A is a plan view illustrating a touch substrate according to an example embodiment of the present invention. FIG. 1B is a cross-sectional view taken along a line I-I' of FIG. 1A.

Referring to FIGS. 1A and 1B, the touch substrate 200 receives a touch signal from an external source, and process the touch signal to detect a touch position.

The touch substrate 200 includes a base substrate 210, a first electrode 241, a second electrode 242 and a first touch electrode 244a. The touch substrate 200 may further include a second touch electrode 244b to receive the touch signal better. The base substrate 210 includes a first surface and a second surface opposite to the first surface, and the area of the first surface that can detect a touch is referred to as a touched area.

The first electrode 241, the second electrode 242, the first touch electrode 244a and the second touch electrode 244b are formed in the touched area of the first surface. The first touch electrode 244a is formed in an area in which the first and second electrodes 241 and 242 cross each other and is formed on, i.e. over, the first electrode 241. When the second touch electrode 244b is formed, the second touch electrode 244b is formed in the area in which the first and second electrodes 241 and 242 cross each other and is formed on, or over, the second electrode 242. The layout and relative positions of the first and second electrodes 241 and 242 are not limited to the configuration shown, and each can be positioned anywhere that allows for detection of a touch.

The first and second electrodes 241 and 242 are formed on the first surface of the base substrate 210.

The first and second electrodes 241 and 242 may include an opaque metal material. For example, the metal material may include any one or more of gold (Au), silver (Ag), copper (Cu) and aluminum (Al).

The first electrode 241 extends generally along a second direction D2 on the first surface of the base substrate 210. The first electrode 241 includes a plurality of first main electrodes 241a and a plurality of first connecting electrodes 241b connecting the first main electrodes 241a to each other. Each of the first connecting electrodes 241b lies between two adjacent first main electrodes 241a along the second direction D2, and connects these adjacent first main electrodes 241a to each other. Each of the first connecting electrodes 241b is not formed, i.e. is not present, in the area directly between adjacent second connecting electrodes 242b. However, each of the first main electrodes 241a is formed, i.e. is present, in the area directly between second connecting electrodes 242b that are adjacent to each other along the first direction D1. The first main electrode 241a has a width substantially the same as or larger than that of the first connecting electrode 241b. A touch is normally detected by the first main electrode 241a, and thus the width of the first main electrode 241a is preferably larger than that of the first connecting electrode 241b.

The second electrode 242 extends generally along the first direction D1 on the first surface of the base substrate 210. The second electrode 242 includes a plurality of second main electrodes 242a and a plurality of second connecting electrodes 242b connecting the second main electrodes 242a to each other. Each of the second connecting electrodes 242b lies between two adjacent second main electrodes 242a along the first direction D1, and connects these adjacent second main electrodes 242a to each other. When touched, the touch is normally detected by the first main electrode 241a, but may be additionally detected by the second main electrode 241a adjacent to the first electrode 241a. Thus, the width of the second main electrode 242a is preferably larger than or substantially the same as that of the second connecting electrode 242b.

A first insulating layer 243 is formed on the first and second electrodes 241 and 242. The first insulating layer 243 includes an insulating material that can transmit light. For example, the insulating material may include silicon nitride, silicon oxide and so on. The first insulating layer 243 has a first contact hole 246 through which the first main electrodes 241 are exposed. When the touch substrate 200 includes the second touch electrode 244b, the first insulating layer 243 may further include contact holes through which the second main electrodes 242a are exposed.

The first touch electrode 244a is formed on the first surface of the base substrate 210, and the first insulating layer 243 is formed thereover. The first touch electrode 244a may include a transparent conductive material such as indium tin oxide (ITO), indium zinc oxide (IZO) and so on. The first touch electrode 244a is electrically connected to the first main electrodes 241a through the first contact hole 246.

When the touch substrate 200 includes the second touch electrode, the second touch electrode 244b may be formed in like manner as the first touch electrode 244a, and may include a material substantially the same as that of the first touch electrode 244a. The second touch electrode 244b is electrically connected to the second main electrodes 242b through the contact holes through which the second main electrodes 242a are exposed.

The first touch electrode 244a is formed in an area in which the touch signal is inputted, and includes a transparent conductive material. Thus, the first touch electrode 244a may maintain or at least prevent significant reduction in the transmittance of the display when formed larger than the first main electrode 241a. In the same manner, the second touch electrode 244b may be larger than the second main electrode 242b.

A second insulating layer 245 is formed on the first surface of the base substrate 210 on which the first touch electrode 244a is formed. The second insulating layer 245 may include an insulating material that transmits light such as silicon nitride, silicon oxide and so on. In the present example embodiment, the first and second electrodes include an opaque metal material. Thus, areas of the first and second electrodes should be minimized to maintain the transmittance. However, a transparent metal material is used to form the touch electrode, so that touch sensitivity is enhanced without significant reduction in overall transmittance.

Thus, resistances due to the first and second electrodes are decreased while transmittance and touch sensitivity are maintained.

FIG. 2 is a plan view illustrating a display apparatus according to another example embodiment of the present invention.

Referring to FIG. 2, the display apparatus according to the present example embodiment includes a touch panel 300, a thin-film transistor (TFT) flexible printed circuit (FPC) board 400 and an integrated driving circuit 50. The touch panel 300 includes an array substrate 100 and a touch substrate 200 which partially overlap each other in the view of FIG. 2.

The touch panel 300 receives touch signals from an external source, and also displays an image. The TFT FPC board 400 and the integrated driving circuit 50 control the array substrate 100 of the touch panel 300. In addition, the integrated driving circuit 50 processes the touch signals and detect the touch position.

The integrated driving circuit 50 may include a data circuit part and a gate circuit part. The data circuit part provides data voltages to pixels of the array substrate 100. The gate circuit part provides gate signals controlling application of the data voltages to the pixels. The gate circuit part may be mounted on the touch panel as a chip, or may be directly integrated on the touch panel, and formed at the same time as the formation of the switching elements of the array substrate 100.

Figure 3:
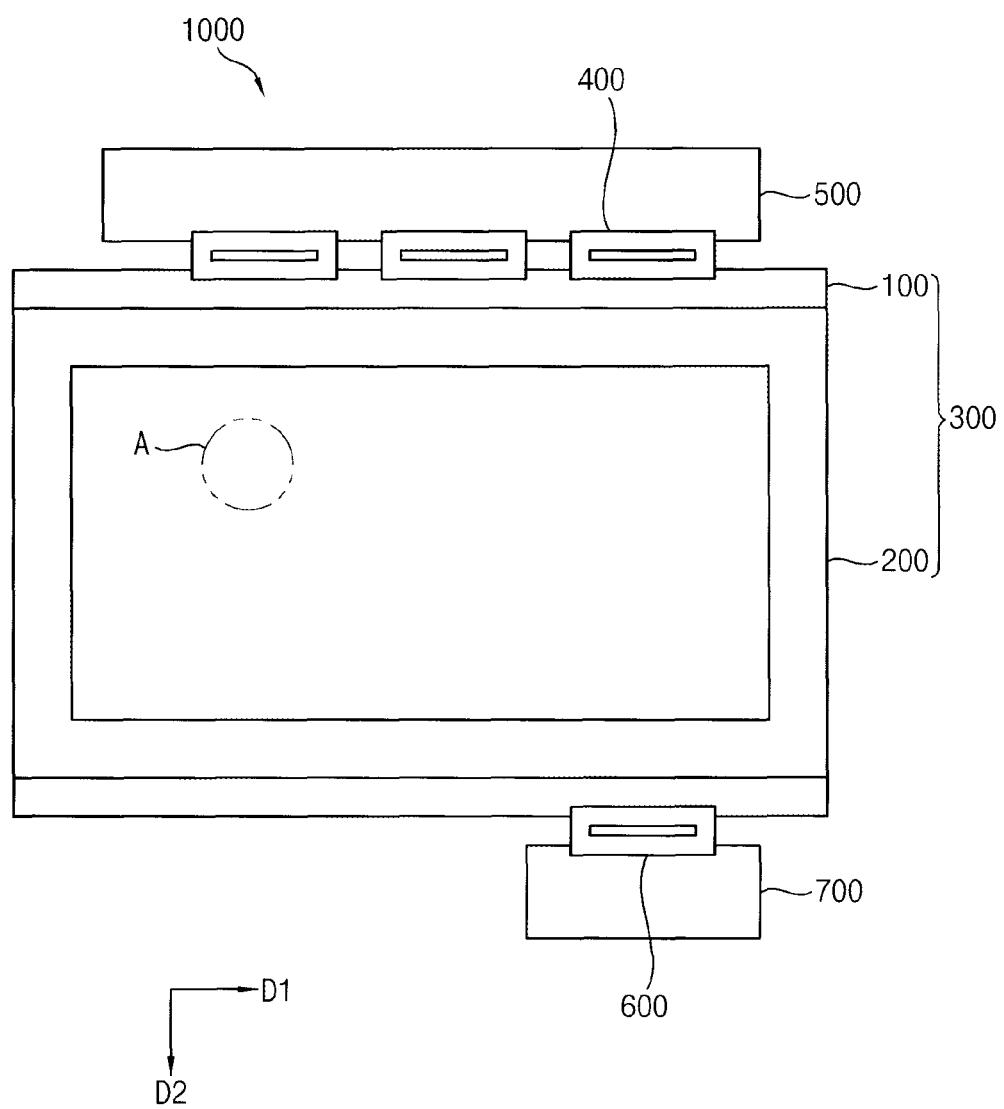
FIG. 3 is a plan view illustrating a display apparatus according to still another example embodiment of the present invention.

FIG. 3 is a plan view illustrating a display apparatus according to still another example embodiment of the present invention.

Referring to FIG. 3, the display apparatus according to the present example embodiment includes a touch panel 300, a thin-film transistor (TFT) flexible printed circuit (FPC) board 400, a TFT driving circuit 500, a touch panel FPC board 600 and a touch panel driving circuit 700. The touch panel 300 includes an array substrate 100 and a touch substrate 200 which partially overlap each other in the view of FIG. 2.

The touch panel 300 receives touch signals from an external source, and also displays an image. The TFT FPC board 400 and the TFT driving circuit 500 control the array substrate 100 of the touch panel 300. The touch panel FPC board 600 and the touch panel driving circuit 700 process the touch signals and detect the touch position.

The TFT driving circuit 500 may include a data circuit part and a gate circuit part. The data circuit part provides data voltages to pixels of the array substrate 100. The gate circuit part provides gate signals controlling application of the data voltages to the pixels. The gate circuit part may be mounted on the touch panel as a chip, or may be directly integrated on the touch panel, and formed at the same time as the formation of the switching elements of the array substrate 100.

Figure 4:
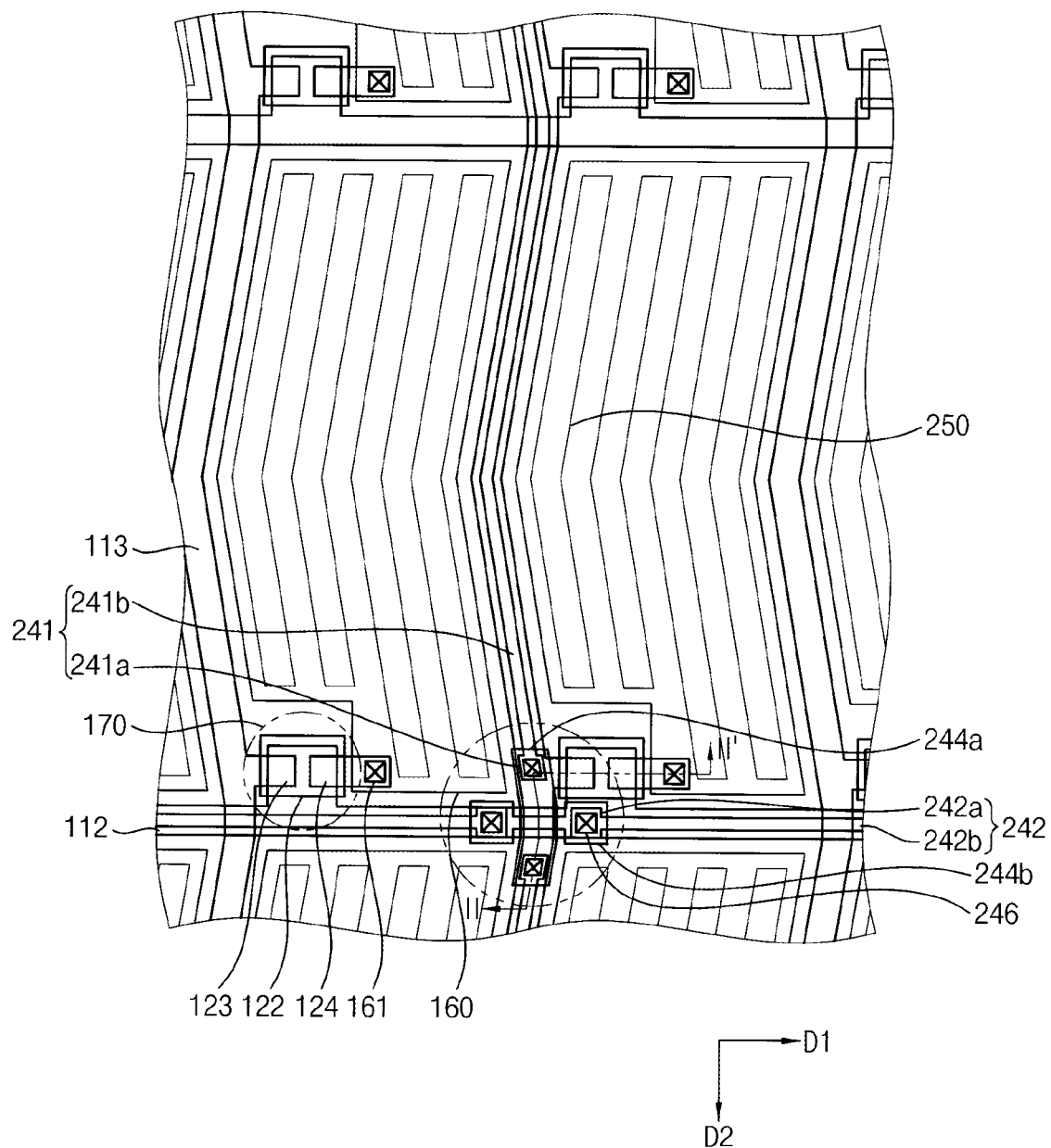
FIG. 4 is an enlarged plan view of portion 'A' of FIG. 3.
Figure 5:
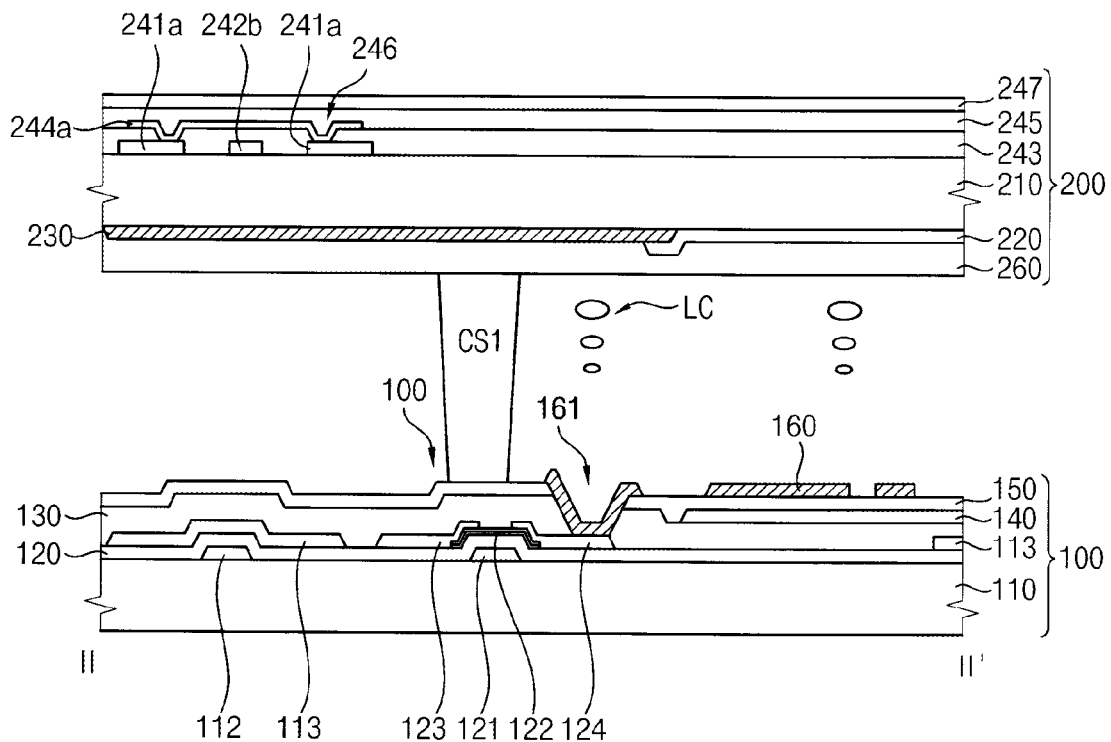
FIG. 5 is a cross-sectional view taken along a line II-II" of FIG. 4.

FIG. 4 is an enlarged plan view of portion 'A' of FIG. 3. FIG. 5 is a cross-sectional view taken along a line II-II' of FIG. 4.

Referring to FIGS. 3 to 5, the array substrate 100 includes signal lines and a plurality of pixels. The signal lines include a plurality of gate lines 112 and a plurality of data lines 113. Each of the pixels includes a switching element connected to the data and gate lines 113 and 112, and a second electrode 160 connected to the switching element 170. The switching element 170 includes a gate electrode 121, a semiconductor layer 122, a source electrode 123 and a drain electrode 124.

The gate line 112 and the gate electrode 121 are formed on the first base substrate 110. A gate insulating layer 120 is formed on the first base substrate 110 on which the gate line 112 and the gate electrode 121 are formed. The semiconductor layer 122 is formed on the gate insulating layer 120. The data lines 113, the source electrode 123 and the drain electrode 124 are formed on the gate insulating layer 120.

The data lines 113 extend generally along the second direction D2. The data lines 113 may be curved or bent at a central portion of the pixel and the resulting curved or bent shape may be symmetric with respect to the central portion of the pixel. In other alternative configurations, the data lines 113 may be more gently curved rather than being bent sharply as shown in FIG. 3, may have more than one curve or bend, and may be curved/bent in other areas besides the central region of the pixel.

A first passivation layer 130 is formed on the first base substrate 110 and over the switching element 170 and the data line 113. The first passivation layer 130 includes a contact hole 161 through which the drain electrode 124 is exposed. The first electrode 140 and a second passivation layer 150 are also formed on the first base substrate 110.

A second electrode 160 is formed on the first base substrate 110 over the second passivation layer 150, and overlaps the first electrode 140. The second electrode 160 includes a plurality of bar-shaped electrodes (i.e. shaped generally as bent or curved lines) and a plurality of openings formed between the bar-shaped electrodes. The second electrode 160 is electrically connected to the drain electrode 124 through the contact hole 161. In the present example embodiment, the second electrode 160 is formed over the first electrode 140, but the various configurations of the invention are not limited thereto. For example, the second electrode 160 may instead be formed under the first electrode 140.

The touch substrate 200 includes a second base substrate 210, a color filter 220, a blocking layer 230, a first electrode 241, a second electrode 242 and a first touch electrode 244a. As above, the touch substrate 200 may further include a second touch electrode 244b to receive the touch signal better.

The touch substrate according to the present example embodiment is substantially the same as the touch substrate according to the previous example embodiment of FIGS. 1A and 2B, and thus any repetitive explanation will be largely omitted.

The second base substrate 210 has a first surface and a second surface opposite to the first surface, and the second surface of the second base substrate 210 faces the first base substrate 110. The first surface includes an area for detecting touches, that corresponds roughly to the area containing the electrodes 241, 242 and the immediately surrounding area. The first electrode 241, the second electrode 242 and the first touch electrode 244a collectively create a touch-sensitive area of the first surface. When the second touch electrode 244b is formed, the second touch electrode 244b is also formed in the touch-sensitive area of the first surface. The color filter 220, the light blocking layer 230, the overcoating layer 260 and a first column spacer CS1 are formed on the second surface of the second base substrate 121.

As above, the first and second electrodes 241 and 242 are formed on the first surface of the second base substrate 210. Each of the first and second electrodes 241 and 242 includes a metal material. Each of the first and second electrodes 241 and 242 may include a material substantially the same as that of the gate line 112 and the data line 113. For example, the metal material may include gold (Au), silver (Ag), copper (Cu) or aluminum (Al). The first electrode 241 may be disposed in an area in which the data line 113 is formed (i.e. over the data line 113 in plan view), and the second electrode 242 may be disposed in an area in which the gate line 112 is formed (i.e. over the gate line 112 in plan view). However, the configurations of the invention are not limited thereto, and the first and second electrodes 241 and 242 may be disposed in other locations, or over other structures of array substrate 100.

A polarizing film 247 may be further formed on the first surface of the second base substrate 210, over the second insulating layer 245.

The light blocking layer 230 is formed on the second surface of the second base substrate 210. The light blocking layer 230 includes an opaque insulating layer for blocking light. The light blocking layer 230 overlaps with the first and second electrodes 241 and 242, in plan view.

The color filter 220 is formed on the second surface of the second base substrate 210 and, in this embodiment, partially overlaps the light blocking layer 230. The color filter 220 may include red, green and blue filters, but any other-colored filters are also contemplated, such as white. Alternatively, the color filter 220 may be formed on the array substrate 100. The invention also includes configurations in which the color filters 220 are substituted with red, green and blue (or any other color) light sources.

The overcoating layer 260 is formed on the second base substrate 220 on which the light blocking layer 230 and the color filter 220 are formed. Thus, a surface of the second base substrate 220 is planarized.

The first spacer CS1 may be formed in an area in which the switching element 130 is formed.

In the present embodiment, a liquid crystal layer LC having a plane to line switching (PLS) mode is interposed between the touch substrate 200 and the array substrate 100. Alternatively, the liquid crystal layer LC may have various modes such as a twisted neumatic (TN) mode, a vertical alignment (VA) mode, an in plane switching (IPS) mode, an electrically controlled birefringence (ECB) mode, etc. Also, the structure of the touch panel may be used for a plasma display panel (PDP) display apparatus, an organic light emitting diode (OLED) display device, an electrophoretic display (EPD) display device, etc.

Figure 6A:
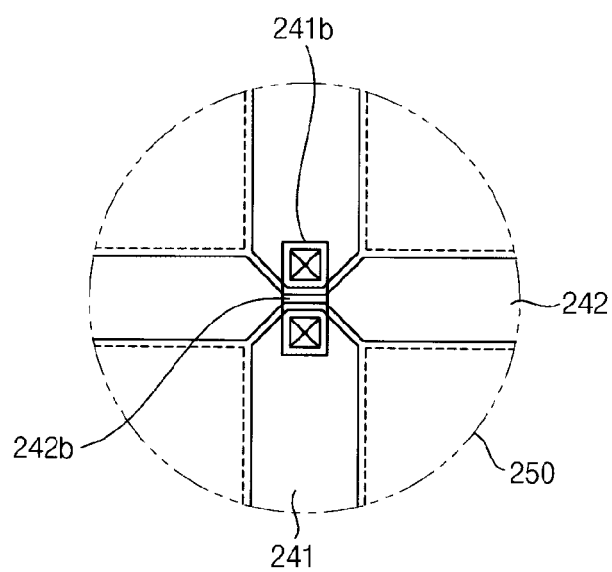
FIG. 6A is a plan view illustrating an example embodiment of the present invention.
Figure 6B:
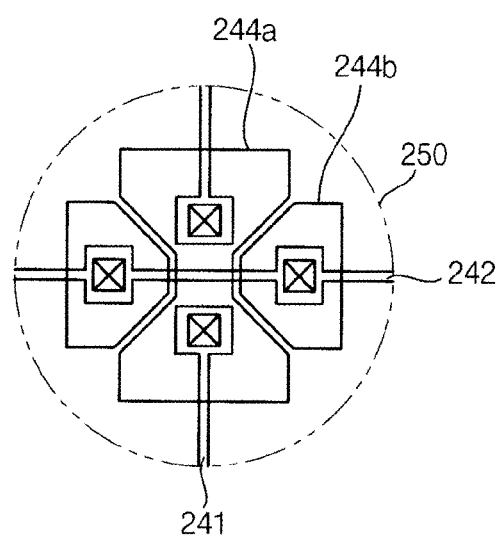
FIG. 6B is a plan view illustrating the sensor part of the display apparatus in FIG. 3.
Figure 7:
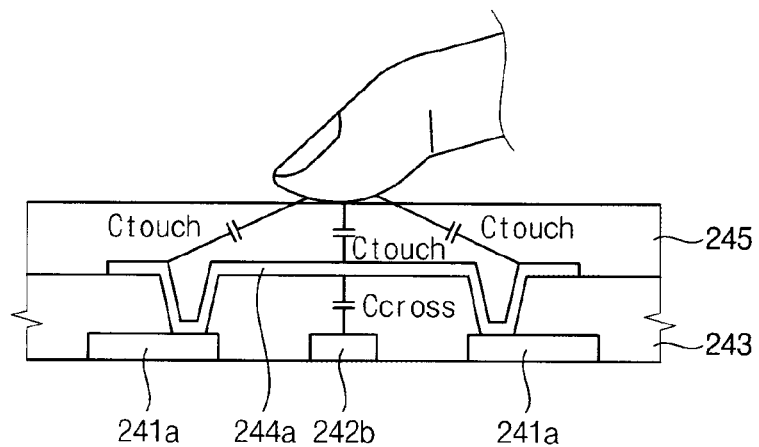
FIG. 7 is a conceptual diagram illustrating a capacitor of a sensor part in touching.

FIG. 6A is a plan view illustrating an example embodiment of the present invention, and FIG. 6B is a plan view illustrating the sensor part of the display apparatus in FIG. 3. FIG. 7 is a conceptual diagram illustrating a capacitor of a sensor part during a touch.

FIG. 6A shows an example structure of a touch line. In this embodiment, each of the first and second electrodes 241 and 242 include a transparent material. Thus, the widths of the first and second electrodes 241 and 242 have substantially no effect on the transmittance of the light.

FIG. 6B shows a touch substrate having the second touch electrode. Each of the first and second electrodes 241 and 242 includes an opaque metal material, and the first and second touch electrodes 244a and 244b including the transparent metal material are respectively formed on the first and second electrodes 241 and 242. Since each of the first and second electrodes 241 and 242 includes an opaque metal material, the widths of the first and second electrodes 241 and 242 are minimized and the widths of the first and second touch electrodes 244a and 244b having the transparent metal material are respectively lager than the first and second electrodes 241 and 242.

A transparent electrode portion of the sensor part 250 in FIG. 6B is about 40% of that of the sensor part 250 in FIG. 6A.

Referring to FIG. 7, a first capacitor Ccross is formed by the second electrode 242, the first insulating layer 243 and the first touch electrode 244a, and a second capacitor Ctouch is formed by the first electrode 241, the first touch electrode 244a, the second insulating layer 245 and an external structure touching the sensor part 250.

When the touch signal is not input to the touch panel, the first capacitor Ccross is formed but the second capacitor Ctouch is not formed.

When the touch signal is inputted to the touch panel, the first and second capacitors Ccross and Ctouch are both formed at the same time. In this case, an electric charge is lost by the outer touch, and the capacitance of the first capacitor Ccross is decreased.

Table 1 shows a change of the first capacitor Ccross from the sensor of FIG. 6A to the sensor of FIG. 6B. In particular, sensors were fabricated to the configurations of FIGS. 6A and 6B, and each was tested. The results are summarized in Table 1.

|  | Sensor of FIG. 6A | Sensor of FIG. 6B |
| --- | --- | --- |
| Ccross (no touch) [pF] | 1.47 | 0.61 |
| Ccross (with touch) [pF] | 1.25 | 0.56 |
| Change in Ccross, ΔC [%] | 15 | 18 |

Referring to Table 1, when a surface area of the sensor part occupies about 40% of that of the example sensor part having the sensor of FIG. 6A, the touch panel has a touch sensitivity an example touch panel having the sensor of FIG. 6A. Thus, when the widths of the first and second electrodes having the opaque metal material are minimized, the areas of the first and second touch electrodes 244a and 244b are controlled to change the touch sensitiveness. That is, first and second electrodes are made of an opaque conductor instead of a transparent conductor, and to compensate for this, the widths of leads of the opaque first and second electrodes are reduced in width relative to the example touch panel having the sensor of FIG. 6A. The first electrode is generally linear, and extends through gaps in the second electrode. Furthermore, the first touch electrode 244a is given a shape (in plan view) with a narrow middle section inbetween the two underlying first electrodes, and two wider sections that fan out from the middle section to cover both first electrodes. The two fanned-out portions of first touch electrode 244a are both wider than the underlying opaque leads, or wires, of the first electrode 241. The second touch electrode 244b has two discontinuous and separate portions, one over one of the second electrodes and the other over the other one of the second electrodes, and each positioned on opposite sides of the middle section of first touch electrode 244a, so that the first touch electrode 244a extends through the gap between the two discontinuous portions of the second touch electrode 244b. Each second touch electrode 244b is larger in surface area (in plan view) than its underlying second electrode 242, and each has a fanned-out shape similar to those of the first touch electrode 244a. Here, each fanned-out shape has a generally rhomboid portion and a generally rectangular portion as shown in FIG. 5B, although any shape or shapes are contemplated. These shapes allow the overall touch sensor to be made smaller and more compact, without significant loss of touch sensitivity.

A method of manufacturing the touch panel according to the present example embodiment is substantially the same as that of manufacturing the example touch panel having the sensor of FIG. 6A, except that the first and second electrodes are formed using an opaque metal material and the areas of the first and second touch electrodes are different. Thus, any method for manufacturing the touch panel will be omitted.

According to the present example embodiment, the first and second electrodes include an opaque metal material, and the widths of the first and second electrodes are reduced or minimized to increase the transmittance of the touch panel. Thus, the resistances due to the first and second electrodes formed on the touch panel may be decreased, as the better conductors tend to be opaque. In addition, the touch electrode including the transparent conductive material is only formed in an area in which a touch can be detected, so that the touch sensitivity may be compensated for even though the widths of the first and second electrode are decreased. Here, the touch electrode formed in the touch-sensitive area is reduced by about 40% as compared to the touch-sensitive area occupied by the example touch electrode of FIG. 5A. However, it has been found that this is still enough to maintain sufficient touch sensitivity.

Thus, the resistances due to the first and second electrodes and the touch electrode may be decreased.

Figure 8:
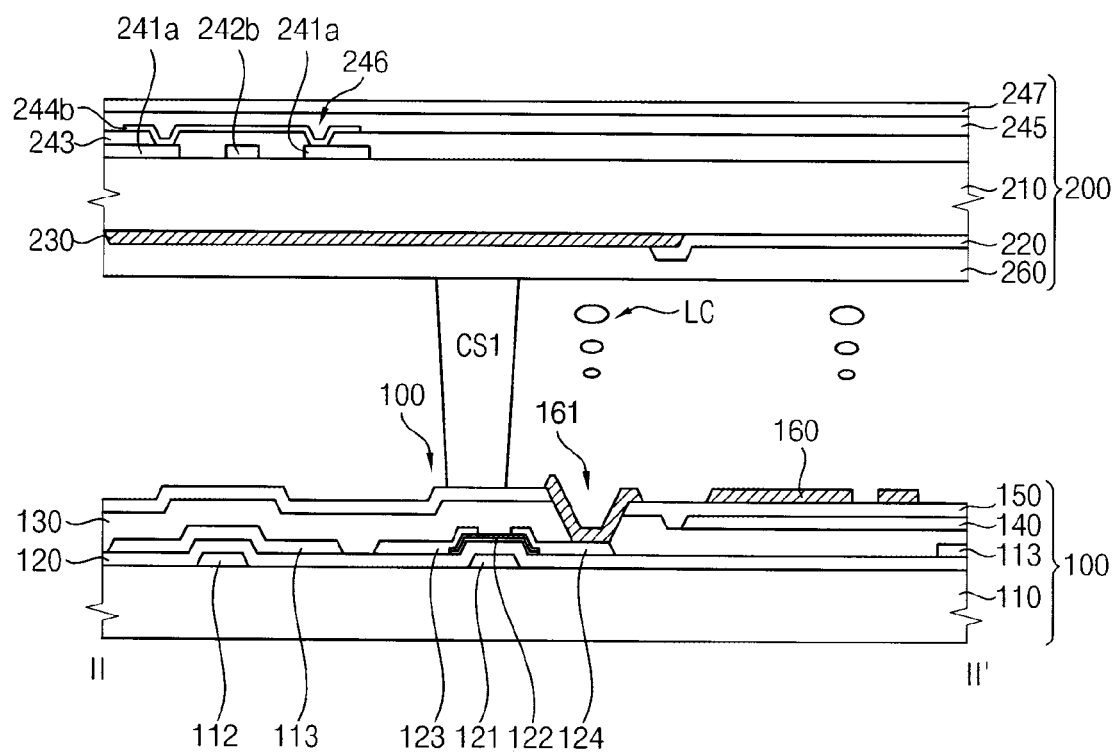
FIG. 8 is a cross-sectional view illustrating a touch panel according to still another example embodiment of the present invention.

FIG. 8 is a cross-sectional view illustrating a touch panel according to still another example embodiment of the present invention.

The touch panel according to the present example embodiment is substantially the same as the touch panel according to the previous example embodiment in FIGS. 3 to 5, except for a structure of a first surface of a touch substrate, and thus same reference numerals are used for same elements and any repetitive explanation may be omitted.

Referring to FIG. 8, the touch substrate 200 includes the second base substrate 210, the color filter 220, the light blocking layer 230, the first electrode 241, the second electrode 242 and the first touch electrode 244a. The touch substrate 200 may further include the second touch electrode 244b. Also, the touch substrate 200 may further include a first insulating layer 243, a second insulating layer 245 and an overcoating layer 260. The second base substrate 210 includes a first surface and a second surface opposite to the first surface, and the second surface of the second base substrate 210 faces the first base substrate. The first surface includes a touch-sensitive area in which a touch can be detected. The first and second electrodes 241 and 242, the first touch electrode 244a, the first insulating layer 243 and the second insulating layer 245 are formed in the touch-sensitive area of the first surface. When the touch substrate 200 includes the second touch electrode 244b, the second touch electrode 244b is disposed in the touched area of the first surface. The light blocking layer 230, the color filter 220 and the overcoating layer 260 are formed on the second surface.

The first touch electrode 244a is formed in or proximate to an area in which the first and second electrodes 241 and 242 cross each other, and is formed on the first electrode 241. When the touch electrode 200 includes the second touch electrode 244b, the second touch electrode 244b is formed in or proximate to an area in which the first and second electrodes 241 and 242 cross with each other, and is formed on the second electrode 242.

The first insulating layer 243 is formed on the first and second electrodes 241 and 242, i.e. on the same side of substrate 210 as the electrodes 241, 242, and formed thereover. The first insulating layer 243 includes an insulating material that may transmit light. The first insulating layer 243 may include an inorganic material such as silicon nitride, silicon oxide, etc. Alternatively, the first insulating layer 243 may include an organic material. Alternatively, a light blocking layer may be formed within the touch sensor, between the first and second electrodes and the touch electrodes. The light blocking layer may include an opaque insulating material for blocking light. For example, the light blocking layer 230 may be formed in an area in which the first and second electrodes 241 and 242, the data line 113 and the gate line 112 are formed.

The first insulating layer 243 includes the first contact holes 246 through which the first main electrodes 241a are exposed. When the touch substrate 200 includes the second touch electrode 244b, the first insulating layer 243 may further include contact holes through which the second main electrodes 242a are exposed.

The first touch electrode 244a is formed on the first surface of the second base substrate 210. The first touch electrode 244a may include a transparent conductive material such as indium tin oxide (ITO), indium zinc oxide (IZO) or the like. The first touch electrode 244a is electrically connected to the first main electrodes 241a through the first contact holes 246.

When the touch substrate 200 includes the second touch electrode 244b, the second touch electrode 244b may be formed via substantially the same method as that used in forming the first touch electrode 244a, and may include materials substantially the same as those used for the first touch electrode 244a. The second touch electrode 244b is electrically connected to the second main electrodes 242a through the contact holes described above.

The insulating layer 245 is formed on the first surface of the second base substrate 210 to overlie the first touch electrode 244a. The insulating layer 245 includes an insulating material, such as silicon nitride, silicon oxide and so on.

The polarizing film 247 may also be formed on the first surface of the second base substrate 210.

The light blocking layer 230 is formed on the second surface of the second base substrate 220, and corresponds to signal lines and a switching element 170 of the array substrate 100.

The color filter 220 is formed on the second base substrate 220 having the light blocking layer 230, and corresponds to a second electrode 160 of the array substrate 100.

The overcoating layer 260 is formed on the second base substrate 220 on which the light blocking layer 230 and the color filter 220 are formed. The overcoating layer 260 planarizes the second base substrate 220.

A method of forming the touch panel according to the present example embodiment is substantially the same as that of forming the touch panel according to the previous example embodiment in FIGS. 2 to 4, except for forming the light blocking layer between the first and second electrodes. However, the touch panel may be formed via various alternate methods as understood to those of ordinary skill in the art.

According to the present example embodiment, the first and second electrodes include an opaque metal material. Thus, the areas of the first and second electrodes are minimized to maintain the optical transmittance of the panel. However, the touch electrode is formed on the touched surface with a transparent metal material, to help maintain touch sensitivity.

Thus, the resistances of the first and second electrodes may be decreased while transmittance and touch sensitivity may be maintained.

In addition, the light blocking layer is formed between the first and second electrodes, and thus does not add to the overall thickness of the touch panel. Thus, the touch panel may have a reduced thickness, and may be manufactured more simply.

Figure 9:
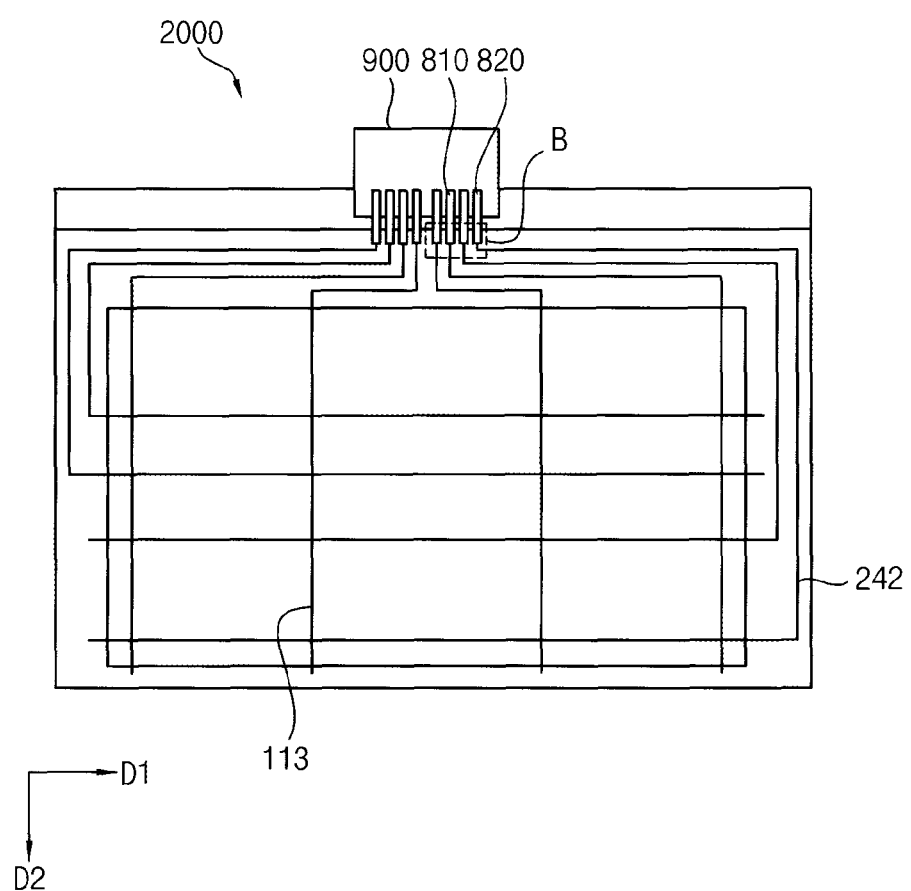
FIG. 9 is a plan view illustrating a display apparatus according to still another example embodiment of the present invention.

FIG. 9 is a plan view illustrating a display apparatus according to still another example embodiment of the present invention.

The touch panel according to the present example embodiment is substantially the same as the touch panel according to the previous example embodiment in FIGS. 2 to 4, and thus like reference numerals are used for the same elements and any repetitive explanation will be omitted.

Referring to FIG. 9, the display apparatus 2000 includes a touch panel 300, a TFT FPC board 810, a touch panel FPC board 820, and a TFT and touch panel driving circuit 900. The TFT FPC board 810, the touch panel FPC board 820 and the TFT and touch panel driving circuit 900 are disposed at a side of the touch panel 300. The touch panel 300 includes an array substrate 100 and the touch substrate 200. In the present example embodiment, the TFT FPC board and the touch panel FPC board are formed with pads different from each other, but the embodiments of the invention are not limited thereto. Alternatively, the TFT FPC board and the touch panel FPC board are formed with pads substantially the same with each other, and are disposed at the substantially same side of the touch panel.

Figure 10:
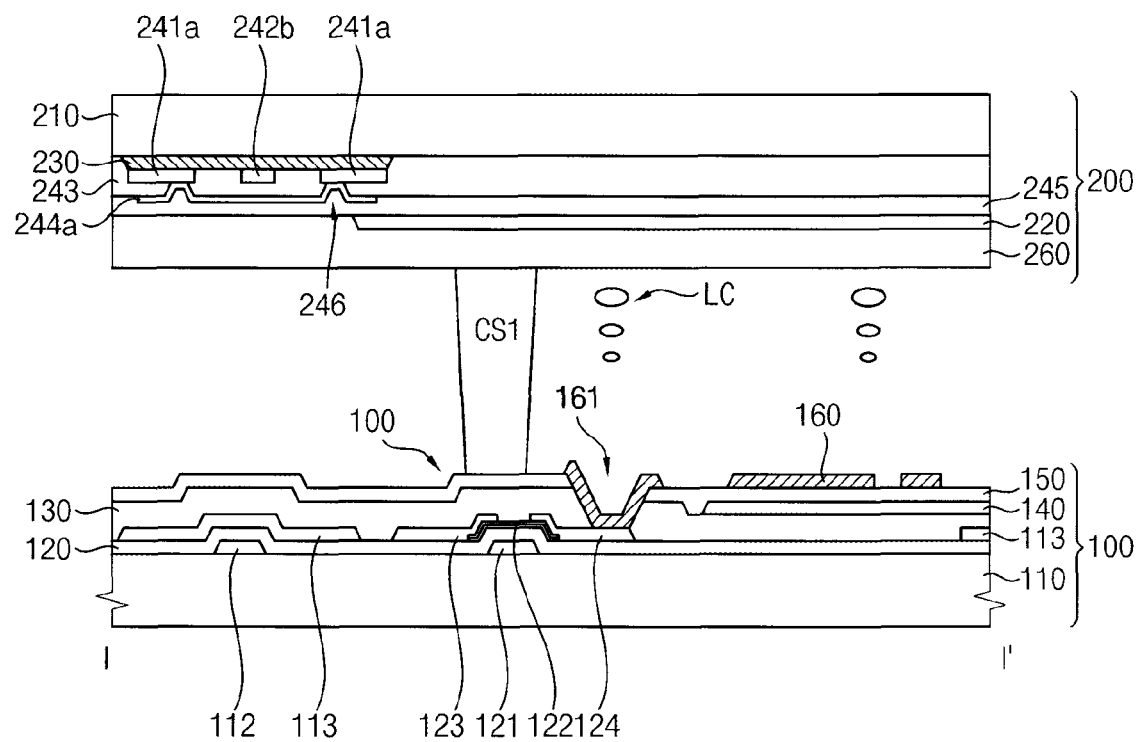
FIG. 10 is a cross-sectional view illustrating a touch panel of FIG. 9.

FIG. 10 is a cross-sectional view illustrating a touch panel of FIG. 9.

Referring to FIGS. 3, 8 and 9, the touch substrate 200 includes the second base substrate 210, the color filter 220, the light blocking layer 230, the first electrode 241, the second electrode 242 and the first touch electrode 244a. The touch substrate 200 may further include the second touch electrode 244b. The touch substrate 200 may further include an overcoating layer 260. The second base substrate 210 has a first surface and a second surface opposite to the first surface, and the second surface of the second base substrate 210 faces the first base substrate 110. The first surface includes a touch-sensitive area in which a touch can be detected. The first and second electrodes 241 and 242, the first touch electrode 244a, the light blocking layer 230 and the color filter 220 are disposed on the second surface. When the touch substrate 200 includes the second touch electrode 244b, the second touch electrode 244b is formed on the second surface.

The light blocking layer 230 is formed on the second surface of the second base substrate 210. The light blocking layer includes an opaque insulating material blocking the light. The light blocking layer 230 overlaps with the first and second electrodes 241 and 242, and is formed to overlie the first and second electrodes 241 and 242, the data line 113 and the gate line 112.

Figure 11:
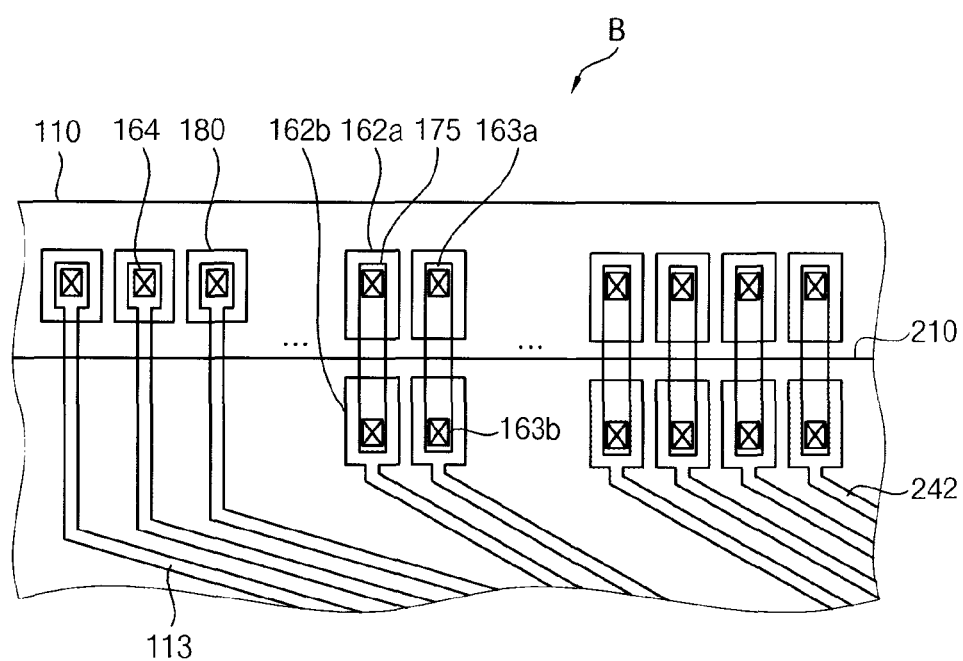
FIG. 11 is an enlarged plan view of portion 'B' of FIG. 9.
Figure 12:
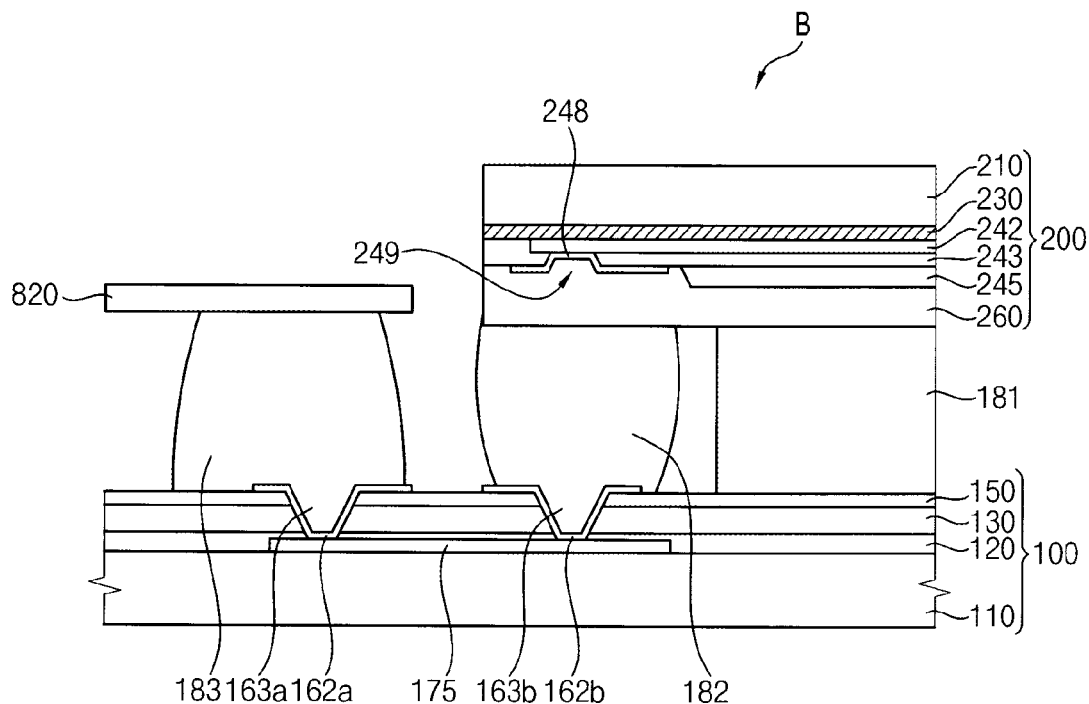
FIG. 12 is a cross-sectional view of portion 'B' of FIG. 11.

FIG. 11 is an enlarged plan view of portion 'B' of FIG. 10. FIG. 12 is a cross-sectional view of portion 'B' of FIG. 10.

Referring to FIGS. 9 to 12, a touch signal pad 175 and a TFT pad 180 are disposed on the first base substrate 110. The touch signal pad 175 and the TFT pad 180 may be formed of material or materials substantially the same as the gate line 112. The touch signal pad 175 and the TFT pad 180 are electrically connected to the touch panel FPC board 820 and the TFT FPC board 810, respectively.

The gate insulating layer 120, the first passivation layer 130 and the second passivation layer 150 are sequentially formed on the first base substrate 110 on which the touch signal pad 175 and the TFT pad 180 are formed.

The first passivation layer 130 and the second passivation layer 150 include a second contact hole 163a and a third contact hole 163b through which the touch signal pad 175 is exposed. The second contact hole 163a is disposed adjacent to the touch panel FPC board 820, and the third contact hole 163b is disposed adjacent to the touch panel 300.

In addition, the first and second passivation layers 130 and 150 include a fourth contact hole 164 through which the TFT pad 180 is exposed.

A third connecting electrode 162a and a fourth connecting electrode 162b are formed on the first base substrate 110. The third and fourth connecting electrodes 162a and 162b are connected to the touch signal pad 175 through the second and third contact holes 163a and 163b, respectively. Each of the third and fourth connecting electrodes 162a and 162b may include a transparent conductive material, such as ITO, IZO, and so on.

A fifth contact hole 249 is formed adjacent to the TFT and touch panel driving circuit 900 of the second base substrate 210, and is formed through the first insulating layer 243. The second electrode 242 is exposed by the fifth contact hole 249.

A fifth connecting electrode 248 is formed on the first insulating layer 243 through which the fifth contact hole 249 is formed. The fifth connecting electrode 248 is connected to the second electrode 242 through the fifth contact hole 249. The fifth connecting electrode 248 may include a transparent conductive material, such as ITO, IZO and so on.

The overcoating layer 260 covers the fifth connecting electrode 248 and the second insulating layer 245 to planarize the touch substrate 200.

A bump 182 is formed between the fifth connecting electrode 248 on the second base substrate 210 and the fourth connecting electrode 162b on the first base substrate 110. The second electrode 242 is electrically connected to the touch signal pad 175 through the bump 182. For example, the bump 182 may include one or more conductive materials such as gold (Au), nickel (Ni), indium (In) and so on.

The touch panel FPC board 820 and the third connecting electrode 162a are connected through an anisotropic conductive film (ACF) 183. The ACF 183 is attached on the third connecting electrode 162a on the first base substrate 110 and the touch panel FPC 820 is attached to the opposite end of the ACF 183, so that the touch panel FPC board 820 and the touch signal pad 175 are electrically connected with each other.

Thus, the touch signal detected by the second electrode 242 is transmitted to the touch panel FPC board 820 through the touch signal pad 175.

Although not shown in FIG. 9, the TFT and touch panel driving circuit 900 may include data and gate driving circuits. The data driving circuit provides data voltages to the pixels, and the gate driving circuit provides gate signals to the pixels for controlling a charging time for the data voltage. The gate driving circuit may be mounted on the display panel as a chip, or may be directly integrated on the display panel during manufacturing of the switching element.

According to the present example embodiment, each of the first and second electrodes includes an opaque metal material. Thus, areas of the first and second electrodes are minimized to maintain transmittance. However, the touch electrode is formed using a transparent metal material, to maintain touch sensitivity.

Thus, the transmittance and the touch sensitivity may be maintained while the resistances of the first and second electrodes may be decreased.

In addition, the first and second electrodes can be formed inside of the touch panel (i.e., on its inner surface, facing the array substrate). Thus, one surface of the second base substrate is patterned to form the touch panel, and a turning process for the second base substrate may be omitted in manufacturing the touch panel, which means that the touch panel may be manufactured more simply.

In addition, the first and second electrodes of the touch substrate, and the gate and data lines of the array substrate face each other, and thus a circuit film of the touch substrate and a circuit film of the array substrate may be integrally used, i.e. one circuit film can be used for both the touch substrate and array substrate.

In the present embodiment, the first touch electrode 244a is disposed under the first main electrode 241a and the second connecting electrode 242b. Alternatively, the first touch electrode may be disposed over the first main electrode 241a and the second connecting electrode 242b.

In the present embodiment, the touch substrate 200 includes the overcoating layer 260. Alternatively, the overcoating layer 260 may be omitted.

Figure 13:
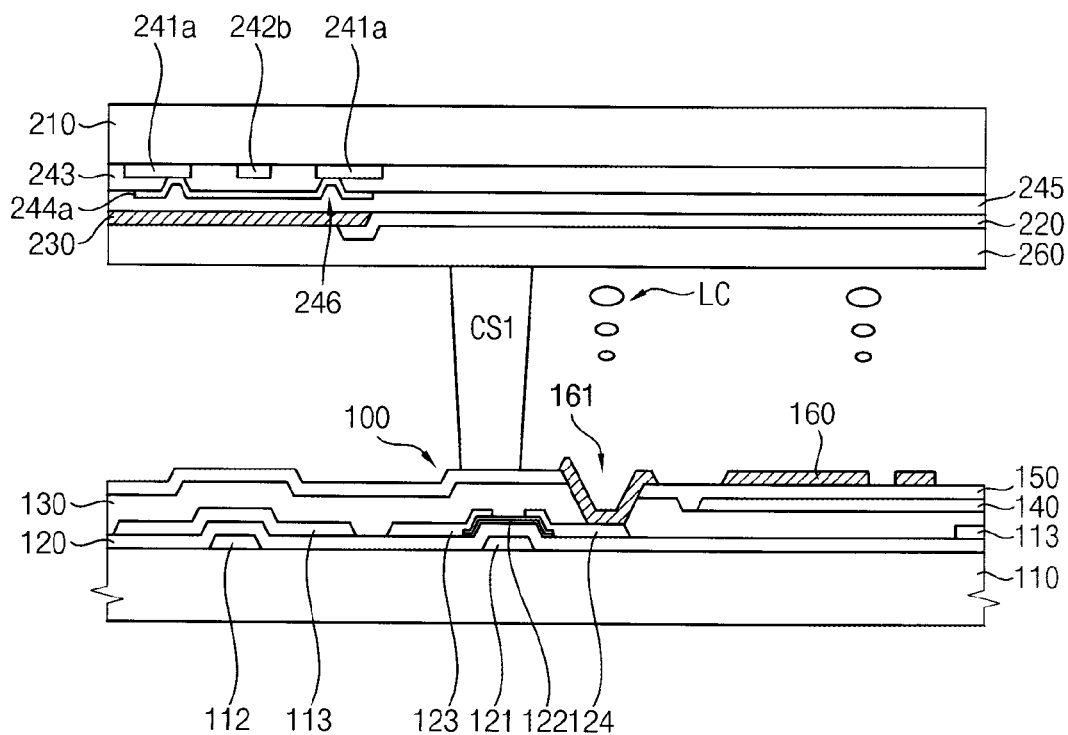
FIG. 13 is a cross-sectional view illustrating a touch panel according to still another example embodiment of the present invention.

FIG. 13 is a cross-sectional view illustrating a touch panel in accordance with still another embodiment of the present invention. The touch panel according to the present example embodiment is substantially the same as that according to the previous example embodiment in FIG. 10 except a light blocking layer 230, and thus same reference numerals are used for same elements and any repetitive explanation will be omitted.

Referring to FIG. 13, a first main electrode 241a and a second connecting electrode 242b are directly formed on the second base substrate 210, and the light blocking layer 230 is formed on the second insulating layer 245. A color filter 220 is formed on the second base substrate 210 on which the light blocking layer 230 is formed.

The overcoating layer 260 is formed on the second base substrate 210 on which the light blocking layer 230 and the color filter 220 are formed. The overcoating layer 260 planarizes the touch substrate 200.

In the present embodiment, the first touch electrode 244a is disposed under the first main electrode 241a and the second connecting electrode 242b. Alternatively, the first touch electrode may be disposed over the first main electrode 241a and the second connecting electrode 242b.

In the present embodiment, the touch substrate 200 includes the overcoating layer 260. Alternatively, the overcoating layer 260 may be omitted.

Figure 14:
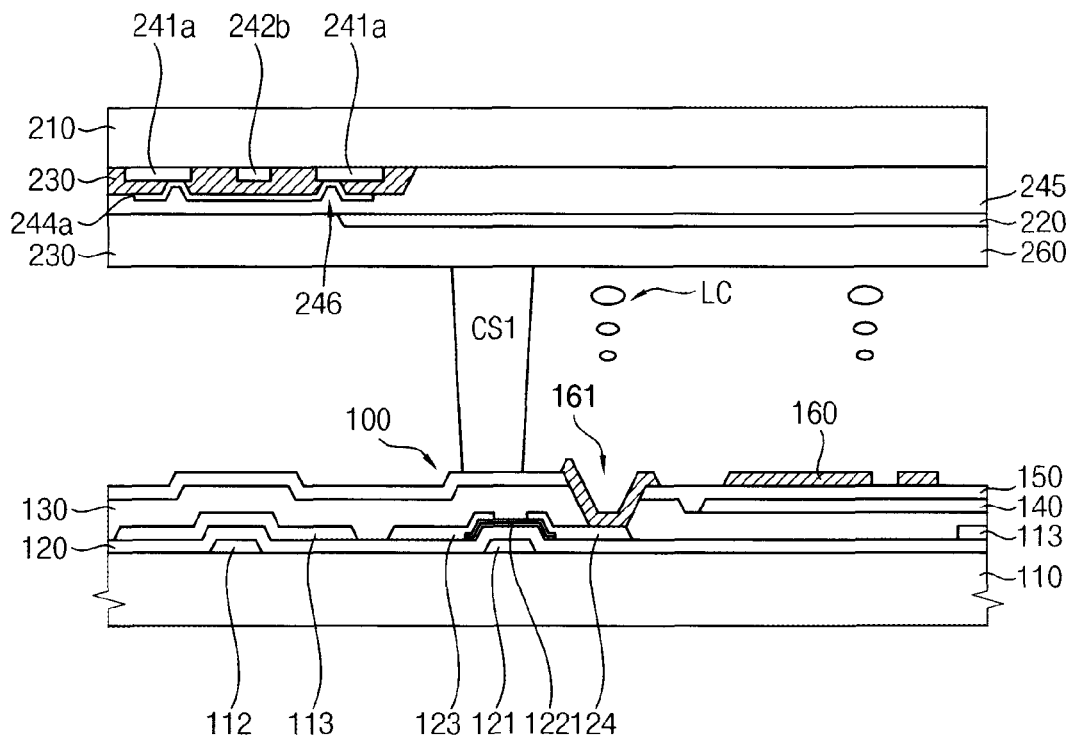
FIG. 14 is a cross-sectional view illustrating a touch panel according to still another example embodiment of the present invention.

FIG. 14 is a cross-sectional view illustrating a touch panel in accordance with still another embodiment of the present invention. The touch panel according to the present example embodiment is substantially the same as that according to the previous example embodiment in FIG. 10 except a light blocking layer 230, a first insulating layer 243 (shown in FIG. 10) and a second insulating layer 245 (shown in FIG. 10), and thus same reference numerals are used for same elements and any repetitive explanation will be omitted.

Referring to FIG. 14, a first main electrode 241a and a second connecting electrode 242b are directly formed on a second base substrate 210. The light blocking layer 230 covers the first main electrode 241a and the second connecting electrode 242b on the second base substrate 210. The light blocking layer 230 has a contact hole 246 through the first main electrode 241a is exposed. In the present invention, the light blocking layer 230 is used for the first insulating layer 243 (shown in FIG. 10). Thus, the first insulating layer may be omitted.

A first touch electrode 244a is formed on the light blocking layer 230 to be electrically connected to the first main electrode 241a through the contact hole 246.

An insulating layer 245 is formed on the second base substrate 210 on which the light blocking layer 230 and the first touch electrode 244a are formed.

In the present embodiment, the first touch electrode 244a is disposed under the first main electrode 241a and the second connecting electrode 242b. Alternatively, the first touch electrode may be disposed over the first main electrode 241a and the second connecting electrode 242b.

In the present embodiment, the touch substrate 200 includes the overcoating layer 260. Alternatively, the overcoating layer 260 may be omitted.

Figure 15:
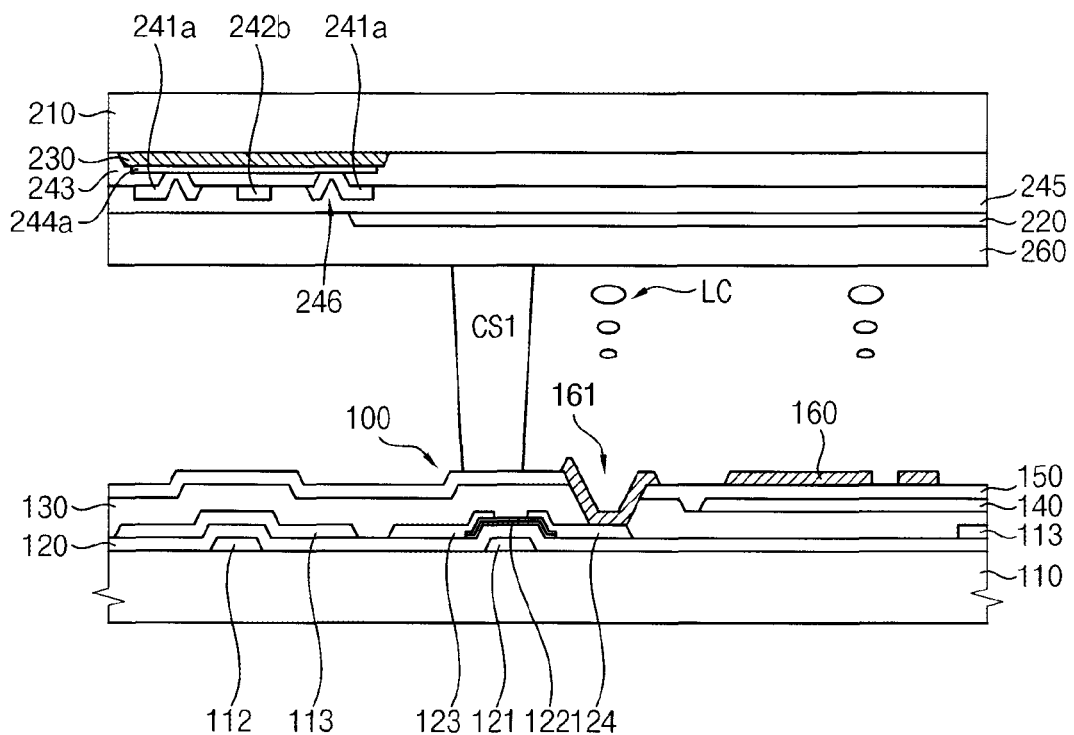
FIG. 15 is a cross-sectional view illustrating a touch panel according to still another example embodiment of the present invention.
Figure 16:
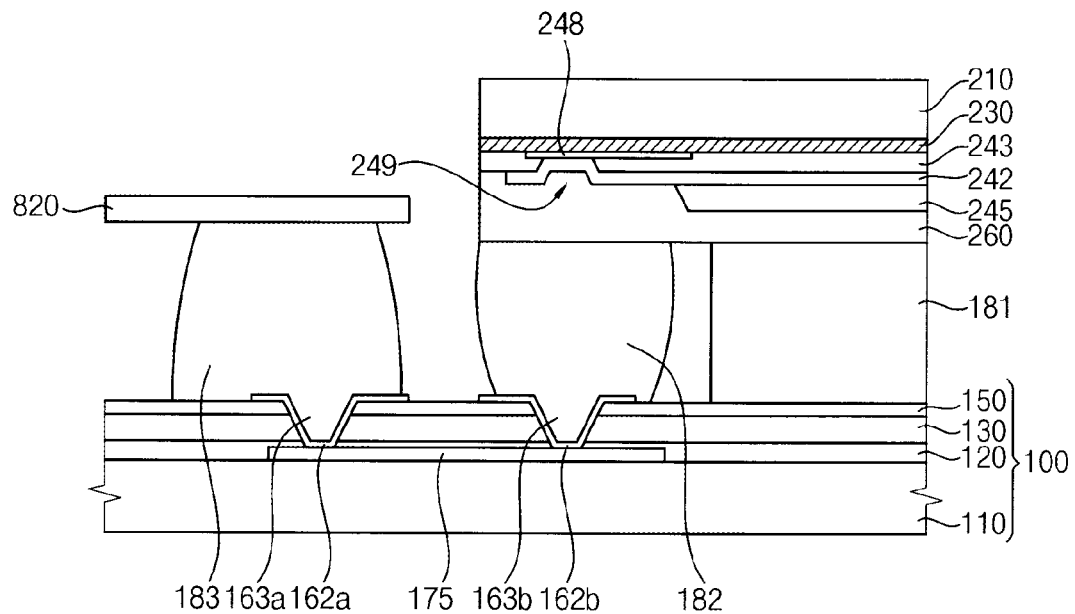
FIG. 16 is a cross-sectional view illustrating a peripheral portion of the touch panel of FIG. 15.

FIG. 15 is a cross-sectional view illustrating a touch panel in accordance with still another embodiment of the present invention. FIG. 16 is a cross-sectional view illustrating a peripheral portion of the touch panel of FIG. 15. The touch panel according to the present example embodiment is substantially the same as that according to the previous example embodiment in FIG. 10 except a first electrode 241 (shown in FIG. 4), a first main electrode 241a, a second connecting electrode 242b, a first touch electrode 244a, a first touch electrode 244a, a second touch electrode 244b (shown in FIG. 4), a second electrode 242 and a fifth connecting electrode 248, and thus same reference numerals are used for same elements and any repetitive explanation will be omitted.

Referring to FIGS. 15 and 16, the light blocking layer 230 is formed on a second base substrate 210.

The first touch electrode 244a and the fifth connecting electrode 248 are formed on the second base substrate 210 on which the light blocking layer 230 is formed.

A first insulating layer 243 is formed on the second base substrate 210 on which the light blocking layer 230, the first touch electrode 244a and the fifth connecting electrode 248. The first insulating layer 243 has a contact hole 246 exposing the first touch electrode 244a and a fifth contact hole 249 exposing the fifth connecting electrode 248.

The second electrode 242 including the first main electrode 241a, the second connecting electrode 242b is formed on the first insulating layer 243. The first main electrode 241a is electrically connected to the first touch electrode 244a through the contact hole 246. The second electrode 242 is electrically connected to the fifth connecting electrode 248 through the fifth contact hole 249.

The second insulating layer 245 is formed on the first insulating layer 243 on which the first main electrode 241a and the second connecting electrode 242b.

In the present embodiment, the touch substrate 200 includes the overcoating layer 260. Alternatively, the overcoating layer 260 may be omitted.

Figure 17:
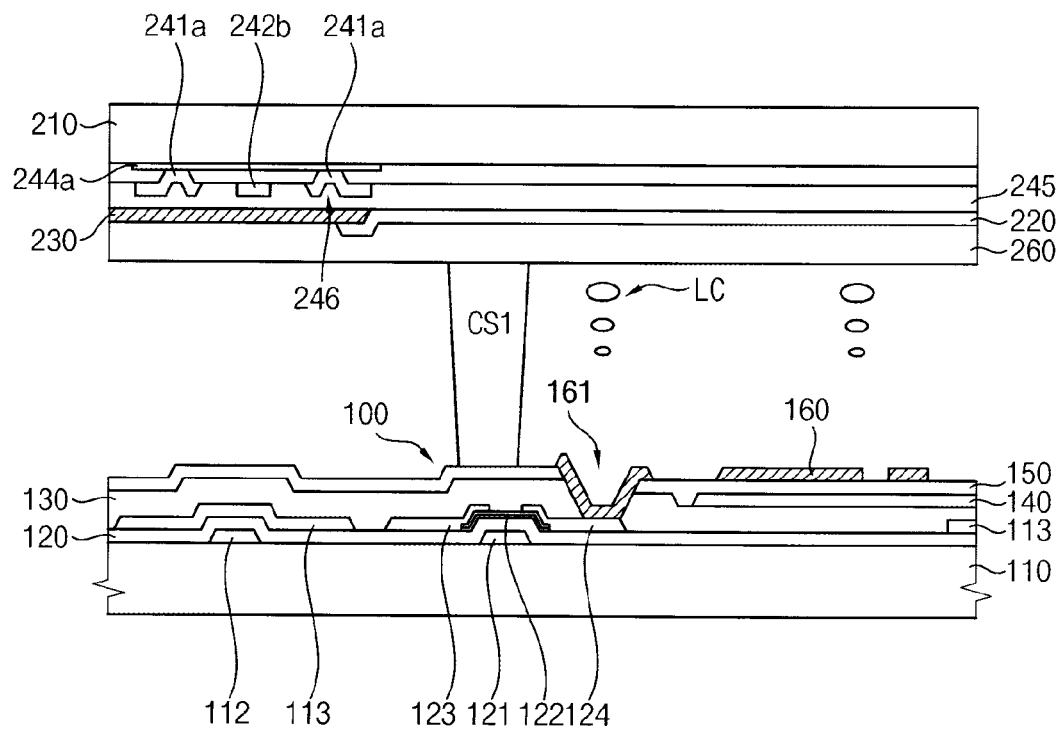
FIG. 17 is a cross-sectional view illustrating a touch panel according to still another example embodiment of the present invention.

FIG. 17 is a cross-sectional view illustrating a touch panel in accordance with still another embodiment of the present invention. The touch panel according to the present example embodiment is substantially the same as that according to the previous example embodiment in FIG. 15 except a light blocking layer 230, and thus same reference numerals are used for same elements and any repetitive explanation will be omitted.

Referring to FIG. 17, a first touch electrode 244a is directly formed on the second base substrate 210, and the light blocking layer 230 is formed on the second insulating layer 245. A color filter 220 is formed on the second base substrate 210 on which the light blocking layer 230 is formed.

The overcoating layer 260 is formed on the second base substrate 210 on which the light blocking layer 230 and the color filter 220 are formed. The overcoating layer 260 planarizes the touch substrate 200.

In the present embodiment, the touch substrate 200 includes the overcoating layer 260. Alternatively, the overcoating layer 260 may be omitted.

Figure 18:
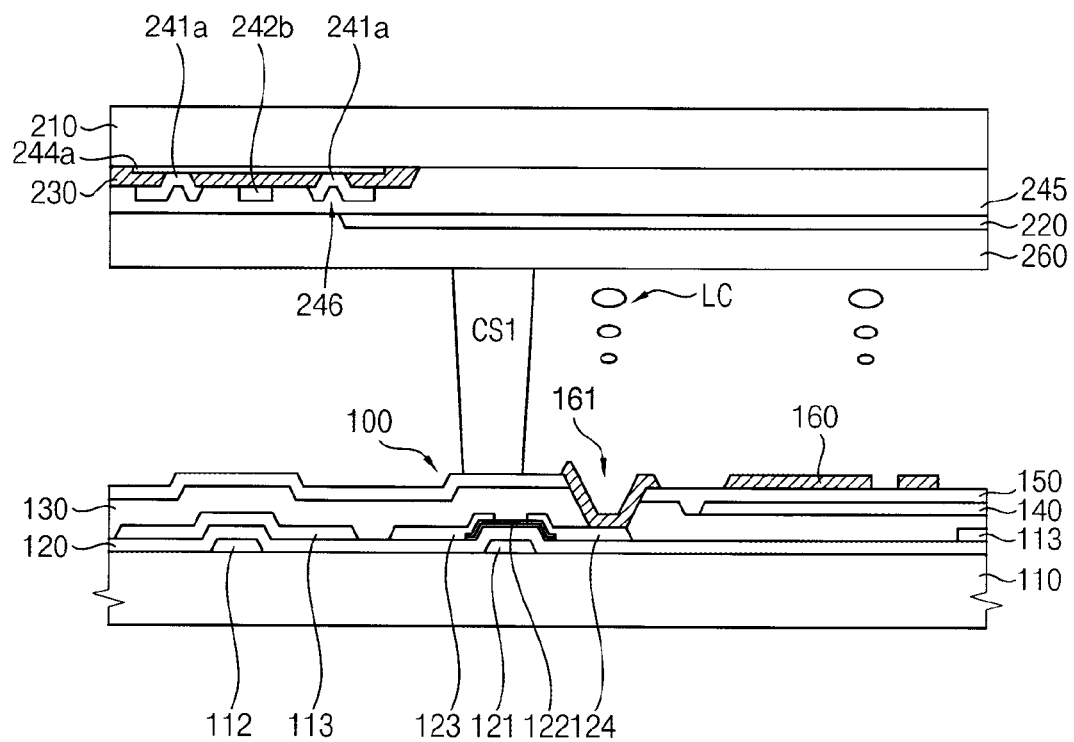
FIG. 18 is a cross-sectional view illustrating a touch panel according to still another example embodiment of the present invention.

FIG. 18 is a cross-sectional view illustrating a touch panel in accordance with still another embodiment of the present invention. The touch panel according to the present example embodiment is substantially the same as that according to the previous example embodiment in FIG. 15 except a light blocking layer 230, a first insulating layer 243 (shown in FIG. 15) and a second insulating layer 245 (shown in FIG. 15), and thus same reference numerals are used for same elements and any repetitive explanation will be omitted.

Referring to FIG. 18, a first touch electrode 244a is directly formed on a second base substrate 210. The light blocking layer 230 covers the first touch electrode 244a on the second base substrate 210. The light blocking layer 230 has a contact hole 246 through the first main electrode 241a is exposed. In the present invention, the light blocking layer 230 is used for the first insulating layer 243 (shown in FIG. 15). Thus, the first insulating layer may be omitted.

A first main electrode 241a and a second connecting electrode 242b are formed on the light blocking layer 230 to be electrically connected to the first touch electrode 244a through the contact hole 246.

An insulating layer 245 is formed on the second base substrate 210 on which the light blocking layer 230, the first main electrode 241a and the second connecting electrode 242b are formed.

In the present embodiment, the touch substrate 200 includes the overcoating layer 260. Alternatively, the overcoating layer 260 may be omitted.

Figure 19:
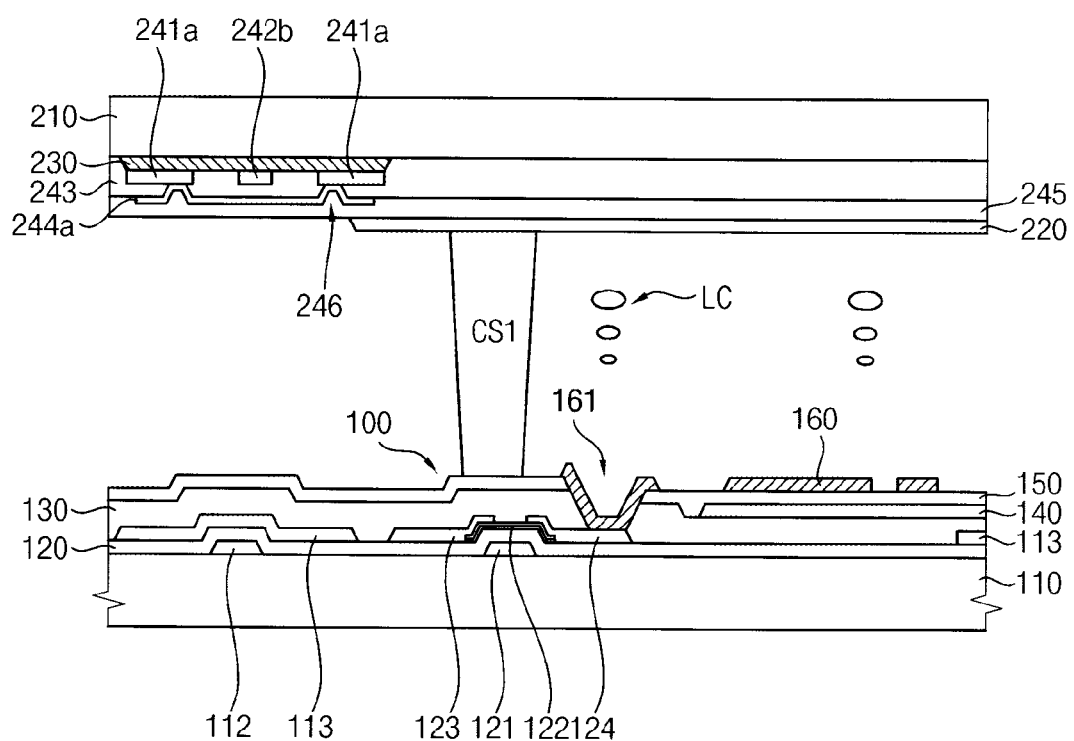
FIG. 19 is a cross-sectional view illustrating a touch panel according to still another example embodiment of the present invention.

FIG. 19 is a cross-sectional view illustrating a touch panel in accordance with still another embodiment of the present invention. The touch panel according to the present example embodiment is substantially the same as that according to the previous example embodiment in FIG. 10 except an overcoating layer 260 (shown in FIG. 10), and thus same reference numerals are used for same elements and any repetitive explanation will be omitted.

Referring to FIG. 19, the touch substrate 200 does not have the overcoating layer 260 (shown in FIG. 10), and makes direct contact with a first spacer CS1. Alternatively, the first spacer CS1 may make contact with a second insulating layer 245.

FIG. 29 is a cross-sectional view illustrating a touch panel in accordance with still another embodiment of the present invention. The touch panel according to the present example embodiment is substantially the same as that according to the previous example embodiment in FIG. 15 except an overcoating layer 260 (shown in FIG. 15), and thus same reference numerals are used for same elements and any repetitive explanation will be omitted.

Figure 20:
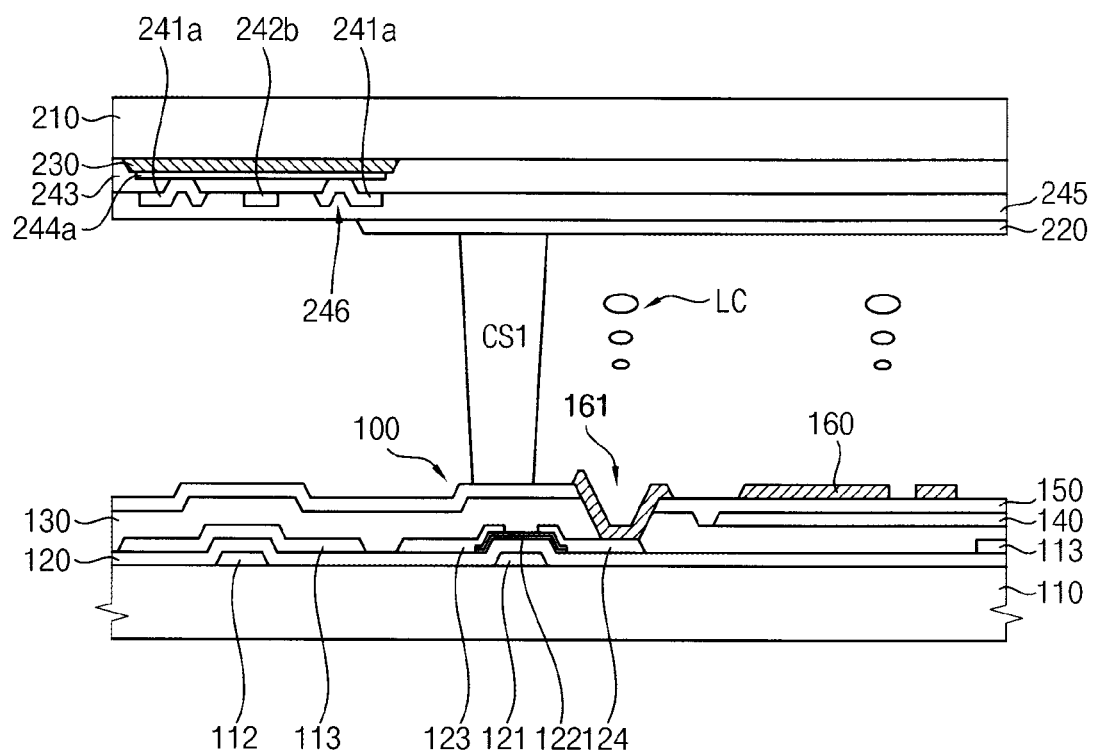
FIG. 20 is a cross-sectional view illustrating a touch panel according to still another example embodiment of the present invention.

Referring to FIG. 20, the touch substrate 200 does not have the overcoating layer 260 (shown in FIG. 15), and makes direct contact with a first spacer CS1. Alternatively, the first spacer CS1 may make contact with a second insulating layer 245.

Figure 21:
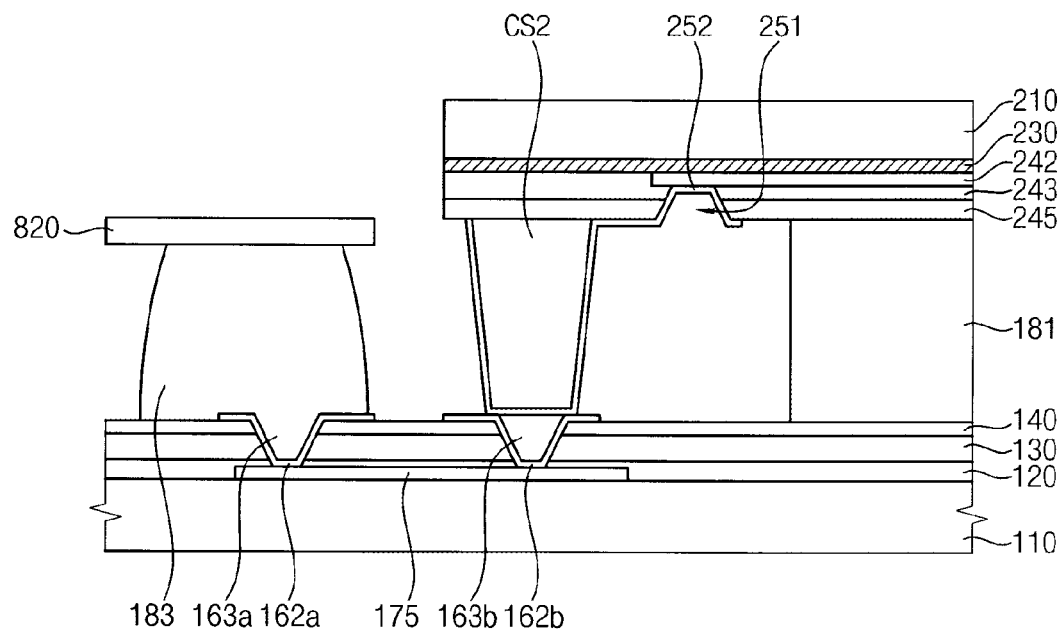
FIG. 21 is a cross-sectional view illustrating a touch panel according to still another example embodiment of the present invention.

FIG. 21 is a cross-sectional view illustrating a touch panel according to still another example embodiment of the present invention.

The touch panel according to the present example embodiment is substantially the same as that according to the previous example embodiment in FIGS. 8 to 12, and thus same reference numerals are used for same elements and any repetitive explanation will be omitted.

Referring to FIG. 21, a sixth contact hole 251 is formed adjacent to the TFT and touch panel driving circuit 900 of the second base substrate 210, and is formed through the first insulating layer 243 and second insulating layer 245. The second electrode 242 is exposed by the sixth contact hole 251.

A second spacer CS2 is formed on the first insulating layer 243 through which the sixth contact hole 251 is formed. The second spacer CS2 maintains a distance between the touch substrate 200 and the array substrate 100.

A sixth connecting electrode 252 is formed on the first insulating layer 243 and on the second spacer CS2. The sixth connecting electrode 252 is connected to the second electrode 242 through the sixth contact hole 251. The sixth connecting electrode 252 may include a transparent conductive material, such as ITO, IZO and so on.

The touch substrate 200 and the array substrate 100 are electrically connected with each other through the sixth connecting electrode 252 and the fourth connecting electrode 162b, as shown. In particular, the sixth connecting electrode 252 contacts the fourth connecting electrode 162b.

Touch signals detected by the second electrode 242 of the touch substrate 200 are thus transmitted to the touch panel FPC board 820 through the touch signal pad 175.

Figure 22:
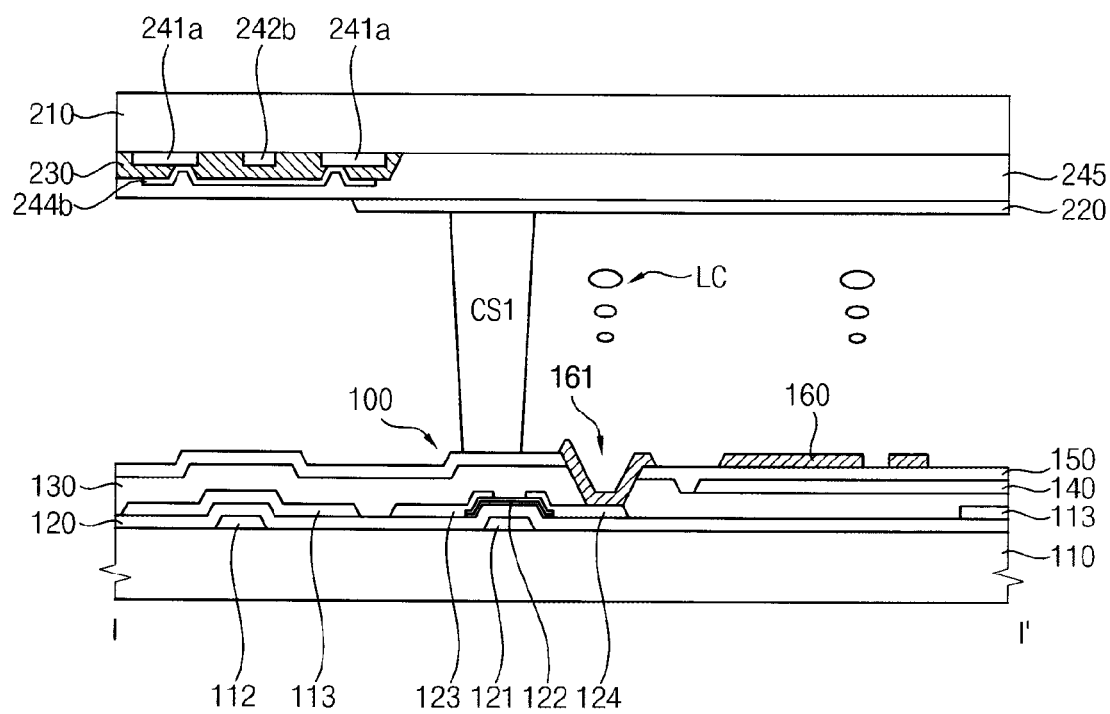
FIG. 22 is a cross-sectional view illustrating a touch panel according to still another example embodiment of the present invention.

FIG. 22 is a cross-sectional view illustrating a touch panel according to still another example embodiment of the present invention.

The touch panel according to the present example embodiment is substantially the same as that according to the previous example embodiment in FIGS. 8 to 12. Thus, same reference numerals are used for same elements and any repetitive explanation will be omitted.

Referring to FIG. 22, the touch substrate 200 includes the second base substrate 210, the color filter 220, the light blocking layer 230, the first electrode 241, the second electrode 242 and the first touch electrode 244a. The touch substrate 200 may further include the second touch electrode 244b. The second base substrate 210 has a first surface and a second surface opposite to the first surface. The second surface faces the first base substrate 110. The first surface includes touched touch-sensitive area in which inputted touch can be detected. The first and second electrodes 241 and 242, the first touch electrode 244a, the light blocking layer 230 and the color filter 220 are all disposed on the second surface. When the touch substrate 200 includes the second touch electrode 244b, the second touch electrode 244b is also disposed on the second surface.

For example, the light blocking layer 230 is used for a first insulating layer 243 (shown in FIG. 15) so that the first insulating layer may be omitted.

Figure 23:
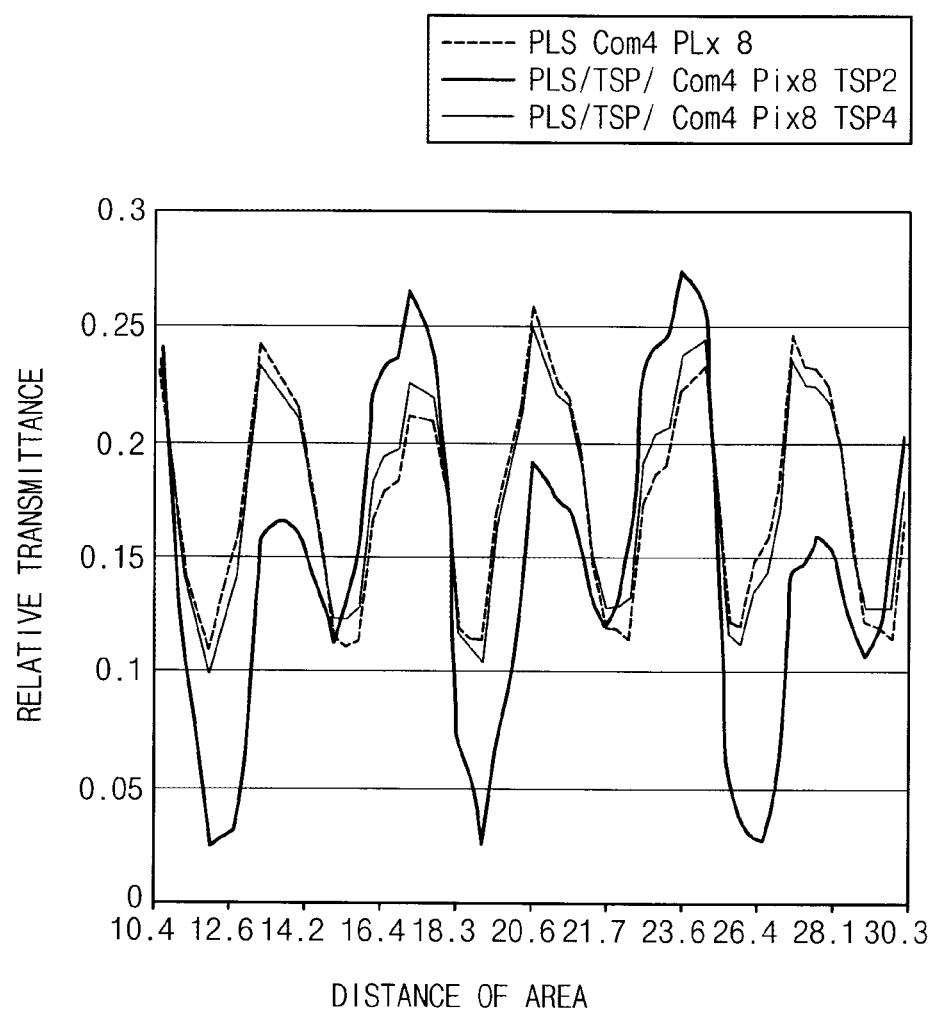
FIG. 23 is a graph of transmittances of the touch panels of FIGS. 8 to 12.
Figure 24A:
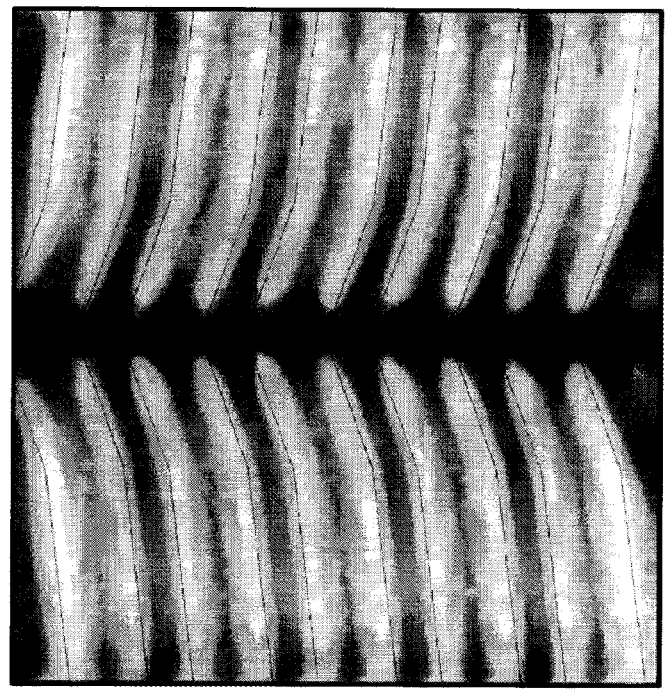
FIGS. 24A to 24C are images illustrating the touch panel corresponding to graphs of FIG. 23.
Figure 24B:
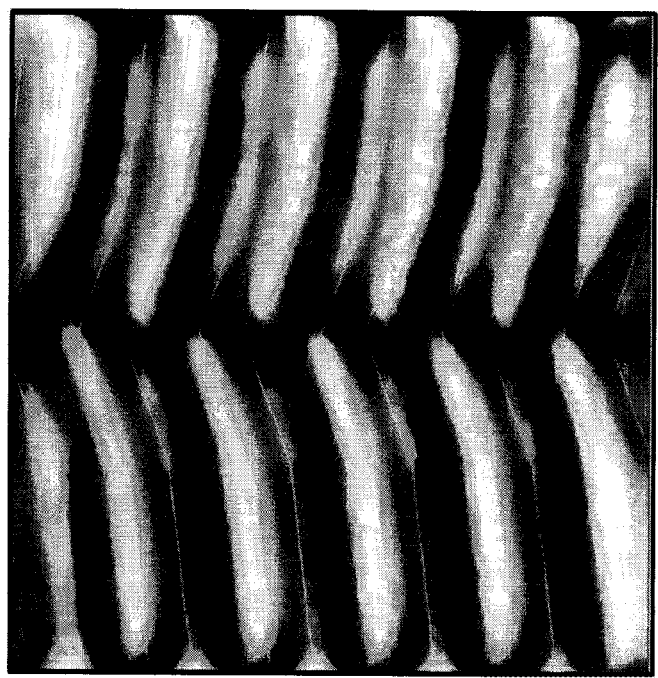
Figure 24C:
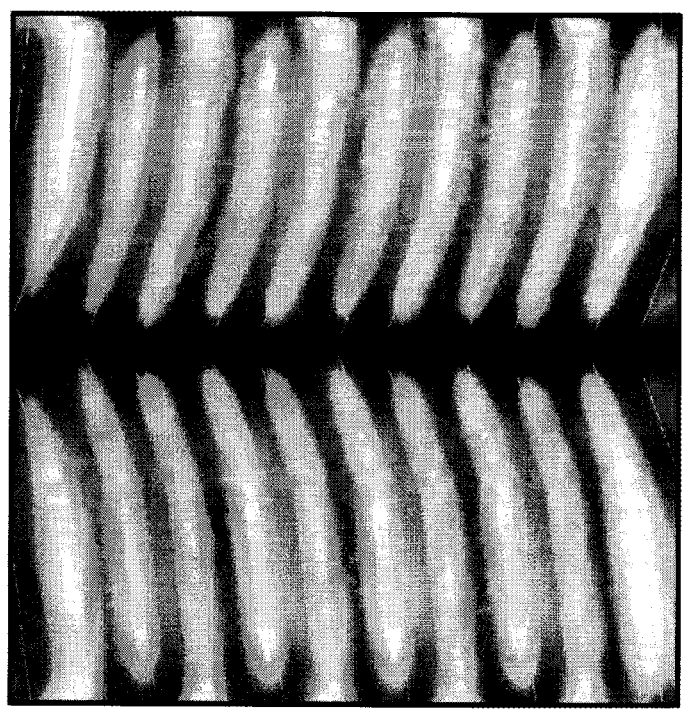

FIG. 23 is a graph of transmittances of the touch panels configured according to FIGS. 8 to 12. FIG. 24A is an image illustrating a touch panel corresponding to a dashed line of FIG. 23. FIG. 24B is an image illustrating a touch panel corresponding to a bold line of FIG. 23. FIG. 24C is an image illustrating a touch panel corresponding to a normal line of FIG. 23. Simulations were performed to test liquid display panels having various structures.

Referring to FIGS. 23 to 24C, a dashed line in the graph shows a transmittance of a liquid display panel having an example plane to line switching (PLS) mode. A bold line in the graph shows the transmittance of touch panels constructed according to the previous example embodiments in FIG. 21, and a reference voltage of the array substrate is about 4V, a pixel voltage is about 8V and a driving voltage of the touch substrate is about 2V. A normal line in the graph shows the transmittance of touch panels constructed according to the previous example embodiments in FIGS. 9 to 12, and the reference voltage of the array substrate is about 4V, the pixel voltage is about 8V and the driving voltage of the touch substrate is about 4V.

In FIG. 14, as illustrated by the dashed line and the bold line, the touch panels of FIGS. 7 to 11 include the first and second electrode inside of a liquid cell, and thus an electric field of liquid crystal molecules depends on the voltage applied to the first and second electrodes. Thus, the relative transmittance in the pixel electrode, as illustrated by the bold line, exhibits greater deviation than that of the dashed line.

However, when the voltage applied to the touch panel is substantially the same as the reference voltage of the array substrate, the touch substrate and the array substrate have no effect on the electric field of the liquid crystal molecules.

Thus, when the voltage applied to the touch panel is maintained substantially the same as the reference voltage of the array substrate, the electric field of the liquid crystal molecules is less affected even though the first and second electrodes are formed inside of the liquid cell. Accordingly, the transmittance of the display is affected very little when the voltage applied to the touch panel is substantially the same as the reference voltage of the array substrate.

In the example embodiments of present invention, a liquid crystal layer LC having a plane to line switching (PLS) mode is interposed between the touch substrate and the array substrate. Alternatively, the liquid crystal layer may have various modes such as a twisted neumatic (TN) mode, a vertical alignment (VA) mode, an in plane switching (IPS) mode, an electrically controlled birefringence (ECB) mode, etc. Also, the structure of the touch panel may be used for a plasma display panel (PDP) display apparatus, an organic light emitting diode (OLED) display device, an electrophoretic display (EPD) display device, etc.

According to the above-mentioned example embodiments, each of the first and second electrodes includes an opaque metal material. Thus, the areas of the first and second electrodes are minimized to maintain transmittance, and the touch electrode is formed on the touched surface using the transparent metal material, to maintain touch sensitivity. In this manner, the resistances of the first and second electrodes may be decreased while the touch sensitivity may be maintained.

In addition, the first and second electrodes can be formed inside of the touch panel. Thus, the touch panel is formed via patterning one surface of the second base substrate, and a turning process for the second base substrate may be omitted. Thus, the touch panel may be manufactured more simply.

The first and second electrodes of the touch substrate, and the gate and data lines of the array substrate face each other, and thus the circuit film of the touch substrate and the circuit film of the array substrate are integrally used, i.e. one circuit film can be used for both the touch substrate and array substrate. Thus, the number of elements for manufacture the touch panel may be decreased.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A touch substrate comprising:
   a first electrode positioned on a side of a substrate, the first electrode including an opaque conductive material and extending along a first direction, the first electrode comprising a plurality of first main electrodes and one or more first connecting electrodes each connecting a pair of the first main electrodes;
   a second electrode including the opaque conductive material, extending along a second direction crossing the first direction, the second electrode having a gap through which the first electrode extends, the second electrode comprising a plurality of second main electrodes and one or more second connecting electrodes positioned on the side of the substrate and each connecting a pair of the second main electrodes;
   a first touch electrode formed on the first electrode and electrically connected to the first electrode; and
   a blocking layer overlapping the first and second electrodes,
   wherein the first main electrodes, the first connecting electrodes, and the second main electrodes each include the opaque conductive material.

2. The touch substrate of claim 1, wherein:
   the first electrode comprises a plurality of first contact holes,
   each of the first connecting electrodes extends along the first direction, connects adjacent ones of the first main electrodes to each other, and has a width narrower than its respective adjacent first main electrodes, and
   the first main electrodes are exposed through a respective one of the first contact holes.

3. The touch substrate of claim 2, wherein the first touch electrode overlaps with one of the first main electrodes, and the first touch electrode is electrically connected to the one of the first main electrodes through one of the first contact holes.

4. The touch substrate of claim 3, wherein an area of the first touch electrode is larger than an area of one of the first main electrodes.

5. The touch substrate of claim 1, wherein:
   the second electrode comprises a plurality of second contact holes,
   the second connecting electrodes extend along the second direction, connect adjacent ones of the second main electrodes to each other, and have gaps spanning intervening first main electrodes, and
   each second main electrode is exposed through one of the second contact holes.

6. The touch substrate of claim 1, wherein the second electrode is formed on the touch substrate, and the second electrode further comprises a plurality of second touch electrodes each electrically connecting two of the second connecting electrodes that lie on opposite ends of one of the gaps.

7. The touch substrate of claim 6, wherein each second touch electrode overlaps a pair of the second main electrodes corresponding to one of the gaps, and is electrically connected to the pair of the second main electrodes through the corresponding second contact hole.

8. The touch substrate of claim 7, wherein an area of the second touch electrode is larger than that of the second main electrode.

9. The touch substrate of claim 6, wherein the second touch electrode includes a transparent conductive material.

10. The touch substrate of claim 6, wherein the second touch electrode is formed on a first surface of the touch substrate.

11. The touch substrate of claim 1, wherein the first touch electrode includes a transparent conductive material.

12. The touch substrate of claim 1, wherein the blocking layer is formed between the first electrode and the second touch electrode.

13. The touch substrate of claim 1, further comprising a color filter formed on the first and second electrodes,
   wherein the first and second electrodes, and the first touch electrode are each formed on a first surface of the touch substrate.

14. A touch substrate comprising:
   a first electrode positioned on a side of a substrate, the first electrode including an opaque conductive material and extending along a first direction, the first electrode comprising a plurality of first main electrodes and one or more first connecting electrodes each connecting a pair of the first main electrodes;
   a second electrode including the opaque conductive material, extending along a second direction crossing the first direction, the second electrode having a gap through which the first electrode extends, the second electrode comprising a plurality of second main electrodes and one or more second connecting electrodes positioned on the side of the substrate and each connecting a pair of the second main electrodes;
   a first touch electrode formed under the first electrode and electrically connected to the first electrode; and
   a blocking layer overlapping the first and second electrodes,
   wherein the first main electrodes, the first connecting electrodes, and the second main electrodes each include the opaque conductive material.

15. The touch substrate of claim 14, further comprising an overcoating layer covering the blocking layer to planarize a surface of the touch substrate.

16. A display apparatus comprising:
   a touch substrate comprising a first electrode positioned on a side of the substrate and having a pair of first main electrodes and a first connecting electrode connecting the first main electrodes, a second electrode having a pair of second main electrodes and a second connecting electrode positioned on the side of the substrate and connecting the second main electrodes, a first touch electrode and a blocking layer, the first electrode extending along a first direction, the second electrode extending along a second direction crossing the first direction and having a gap through which the first electrode extends, the first touch electrode being formed on the first electrode and being electrically connected to the first electrode, the blocking layer overlapping the first and second electrodes;
   an array substrate comprising a touch signal pad for transmitting a touch signal, and further comprising a data pad; and
   a connecting portion electrically connecting the second electrode and the touch signal pad,
   wherein the first main electrodes, the first connecting electrode, and the second main electrodes each include an opaque conductive material.

17. The display apparatus of claim 16, further comprising a flexible printed circuit board electrically connected to the data pad and the touch signal pad.

18. The display apparatus of claim 16, wherein the first and second electrodes, and the touch signal pad each include the opaque conductive material.

19. The display apparatus of claim 16, wherein the touch substrate comprises a third connecting electrode electrically connected to the second electrode, and the array substrate comprises a fourth connecting electrode electrically connected to the touch signal pad.

20. The display apparatus of claim 19, wherein each of the third and fourth connecting electrodes includes a transparent conductive material.

21. The display apparatus of claim 20, wherein the connecting portion is a conductive bump disposed between the third and fourth connecting electrodes and electrically connecting the third connecting electrode to the fourth connecting electrode.

22. The display apparatus of claim 21, wherein the conductive bump includes indium.

23. The display apparatus of claim 20, wherein the touch substrate further comprises a spacer maintaining a space between the touch substrate and the array substrate, and the third connecting electrode is electrically connected to the first electrode and covers the spacer.

24. The display apparatus of claim 23, wherein the third connecting electrode contacts the fourth connecting electrode.

25. The display apparatus of claim 16, wherein the first and second electrodes, and the first and second touch electrodes are all formed on a first surface of the touch substrate, and the touch substrate further comprises a color filter formed on the first and second electrodes.

26. A display apparatus comprising:

a touch substrate comprising a first electrode positioned on a side of the substrate and having a pair of first main electrodes and a first connecting electrode connecting the first main electrodes, a second electrode having a pair of second main electrodes and a second connecting electrode positioned on the side of the substrate and connecting the second main electrodes, a first touch electrode and a blocking layer, the first electrode extending along a first direction, the second electrode extending along a second direction crossing the first direction and having a gap through which the first electrode extends, the first touch electrode being formed under the first electrode and being electrically connected to the first electrode, the blocking layer overlapping the first and second electrodes;

an array substrate comprising a touch signal pad for transmitting a touch signal, and further comprising a data pad; and a connecting portion electrically connecting the second electrode and the touch signal pad, wherein the first main electrodes, the first connecting electrode, and the second main electrodes each include an opaque conductive material.

27. The display apparatus of claim 26, wherein the display apparatus further comprises an overcoating layer covering the blocking layer to planarize a surface of the touch substrate.

* * * * *